(12) United States Patent
DeBoer et al.

(10) Patent No.: US 9,610,851 B2
(45) Date of Patent: Apr. 4, 2017

(54) SYSTEM FOR FLEXIBLE ELECTRICAL AND MECHANICAL INSTALLATION OF AN ELECTRIC VEHICLE CHARGING STATION

(75) Inventors: John DeBoer, Denver, CO (US); John Quentin Cowans, Decatur, GA (US); Timothy Biedrzycki, Powder Springs, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 405 days.

(21) Appl. No.: 13/482,145

(22) Filed: May 29, 2012

(65) Prior Publication Data
US 2013/0020990 A1 Jan. 24, 2013

Related U.S. Application Data

(60) Provisional application No. 61/509,171, filed on Jul. 19, 2011.

(51) Int. Cl.
| | | |
|---|---|---|
| H02J 7/00 | (2006.01) | |
| H02J 7/14 | (2006.01) | |
| B60L 11/18 | (2006.01) | |

(52) U.S. Cl.
CPC ....... *B60L 11/1824* (2013.01); *B60L 2230/12* (2013.01); *H02J 7/0027* (2013.01); *Y02T 10/7005* (2013.01); *Y02T 10/7088* (2013.01); *Y02T 90/12* (2013.01); *Y02T 90/121* (2013.01); *Y02T 90/14* (2013.01)

(58) Field of Classification Search
CPC .......................... B60L 2230/12; B60L 2230/10
See application file for complete search history.

(56) References Cited

U.S. PATENT DOCUMENTS

| | | | | |
|---|---|---|---|---|
| 3,983,311 A | * | 9/1976 | Brumfield | H02G 3/083 174/50 |
| 4,291,817 A | * | 9/1981 | Spitzer et al. | 220/327 |
| 4,583,808 A | * | 4/1986 | Porter et al. | 439/569 |
| 4,647,139 A | | 3/1987 | Yang | |
| 4,753,361 A | * | 6/1988 | Medlin, Jr. | 220/3.6 |

(Continued)

FOREIGN PATENT DOCUMENTS

| | | |
|---|---|---|
| CN | 101934769 A | 1/2011 |
| EP | 0841804 A2 | 5/1998 |

OTHER PUBLICATIONS

Translation of Chinese Office Action mailed Mar. 10, 2015 corresponding to Chinese Application No. 201210248462.6 filed Jul. 18, 2012 (30 pages).

*Primary Examiner* — Samuel Berhanu
*Assistant Examiner* — Tarikh Rankine

(57) ABSTRACT

An electric vehicle charging apparatus is disclosed. The electric vehicle charging apparatus has a housing body that is configurable to provide a number of electrical connection options, such as bottom and rear corded options as well as direct wired options. In another aspect, a mounting installation of the electric vehicle charging apparatus is provided. In yet another aspect, a housing body having a first front cavity and a second front cavity is provided. An inner cover covers the second front cavity, and a maximum amperage set switch is operable to set a maximum charge amperage for the electric vehicle charging apparatus. Methods of configuring the electric vehicle charging apparatus are provided, as are other aspects.

20 Claims, 27 Drawing Sheets

(56) References Cited

U.S. PATENT DOCUMENTS

| | | | | |
|---|---|---|---|---|
| 5,015,983 A * | 5/1991 | DeRosier | H01F 38/30 | |
| | | | 336/173 | |
| 5,095,403 A * | 3/1992 | Pin et al. | 361/641 | |
| 5,202,617 A * | 4/1993 | Nor | B60L 3/12 | |
| | | | 320/109 | |
| 5,239,128 A * | 8/1993 | Golden | H04Q 1/025 | |
| | | | 174/50 | |
| 5,821,485 A * | 10/1998 | Singer et al. | 200/17 R | |
| 6,342,675 B1 * | 1/2002 | DeBartolo et al. | 174/50 | |
| 6,603,660 B1 * | 8/2003 | Ehn et al. | 361/694 | |
| 6,833,683 B2 * | 12/2004 | Winkler | H02J 7/1438 | |
| | | | 320/107 | |
| 8,054,039 B2 * | 11/2011 | Bauerle et al. | 320/109 | |
| 8,466,584 B1 * | 6/2013 | Ledbetter | H02B 13/025 | |
| | | | 307/125 | |
| 8,485,694 B2 * | 7/2013 | Puskar-Pasewicz | H02G 3/14 | |
| | | | 174/50 | |
| 8,558,504 B2 * | 10/2013 | Brown et al. | 320/109 | |
| 2006/0196534 A1 * | 9/2006 | Takada et al. | 136/244 | |
| 2006/0291148 A1 * | 12/2006 | Kelly et al. | 361/637 | |
| 2008/0007945 A1 * | 1/2008 | Kelly et al. | 362/218 | |
| 2010/0165550 A1 * | 7/2010 | Gatti | H02B 3/00 | |
| | | | 361/627 | |
| 2011/0172839 A1 | 7/2011 | Ramirez | | |

* cited by examiner

SYSTEM FOR FLEXIBLE ELECTRICAL AND MECHANICAL INSTALLATION OF AN ELECTRIC VEHICLE CHARGING STATION

RELATED APPLICATIONS

This application claims priority to U.S. Provisional Patent Application Ser. No. 61/509,171 filed on Jul. 19, 2011, entitled "SYSTEM FOR FLEXIBLE ELECTRICAL AND MECHANICAL INSTALLATION OF AN ELECTRIC VEHICLE CHARGING STATION" the disclosure of which is hereby incorporated by reference in its entirety herein.

FIELD

The present invention relates generally to apparatus, systems and methods adapted to electrically charge EVs, and in particular to electric vehicle charging apparatus.

BACKGROUND

With the advent of high fuel prices, the automotive industry has reacted with a selection of Electric Vehicles (EVs). Such EVs are propelled by an electric motor (or motors) that are powered by rechargeable power sources (e.g., battery packs). EVs include both full electric and hybrid electric vehicles. Electric motors have several advantages over internal combustion engines. For example, electric motors may convert about 75% of the chemical energy from the batteries to power the wheels, whereas internal combustion engines are considerably less efficient. EVs emit no tailpipe pollutants when operating in battery mode. Electric motors provide quiet, smooth operation, strong acceleration and require relatively low maintenance.

However, most current EVs can only go about 100-200 miles before requiring electrical recharging. Fully recharging an EV's battery pack may take about 4 to 8 hours. Even a quick charge to about 80% capacity can take about 30 minutes. Furthermore, as battery pack size increases, so does the corresponding charging time. EV charging may take place at the owner's residence using an electric vehicle charging station, sometimes referred to as electric vehicle supply equipment (EVSE).

Such electric vehicle charging stations may be installed at the residence (e.g., in a garage), on an outside wall, or on a post or other structure, and may be electrically coupled to an electrical load center of the residence. Existing EVSEs may be generally quite difficult to install. Furthermore, charging the EV using existing EVSEs may take a long time. Moreover, existing EVSEs may not be readily adapted to outside usage.

Therefore, there is a need for simple, cost effective, and high performance EVSEs, as well as improved methods for installing and operating such electric vehicle charging stations.

SUMMARY

According to a first aspect, an electric vehicle charging apparatus is provided. The electric vehicle charging apparatus includes a housing having a body with a first front cavity, a first rear cavity, and at least one electrical terminal in the first front cavity, the body having a first wiring entry and a second wiring entry being configured to provide a plurality of electrical power connection options to the at least one electrical terminal, the plurality of electrical power connection options comprising an outside cord option wherein an outside cord and coupled outside electrical plug are adapted to electrically connect to an electrical receptacle located outside of a footprint of the body, and the electrical cord is received through the first wiring entry; and a rear receptacle mount option wherein a rear cord and coupled rear electrical plug are received in the first rear cavity and the adapted to electrically connect to an electrical receptacle located inside of the footprint of the body wherein the rear electrical cord is received through the second wiring entry.

According to another aspect, an electric vehicle charging apparatus installation is provided. The electric vehicle charging apparatus installation includes a housing having a lower housing mounting feature and an upper housing mounting feature, and a mounting bracket having a location feature adapted to locate relative to an electrical receptacle, the mounting bracket having one or more installation features adapted to install the mounting bracket to a structure adjacent to the electrical receptacle, a lower bracket mounting feature adapted to receive the lower housing mounting feature, and an upper bracket mounting feature adapted to receive the upper housing mounting feature.

According to another aspect, an electric vehicle charging apparatus is provided. The electric vehicle charging apparatus includes a housing having a body, a first inner cover coupled to the body, and a maximum amperage set switch operable to set a maximum charge amperage for the electric vehicle charging apparatus, wherein the maximum amperage set switch is operable with the first inner cover installed.

According to another aspect, an electric vehicle charging apparatus is provided. The electric vehicle charging apparatus includes a housing having a body with a first front cavity, a second front cavity, a dividing wall separating the first front cavity from the second front cavity, a first inner cover covering the second front cavity, a first rear cavity on a rear of the body, a first wire entry into the first front cavity from a location outside the body, and a second wire entry located between the first front cavity and the first rear cavity; at least one electrical terminal mounted in the first front cavity; a safety cover mounted over the at least one electrical terminal; one or more low voltage electrical terminals or communication terminals located within the first front cavity; and one of a plurality of electrical power connection options to the at least one electrical terminal, the plurality of electrical power connection options including: an outside electrical cord and coupled outside electrical plug adapted to electrically connect to an electrical receptacle located outside of a footprint of the body, wherein the outside electrical cord is received through the first wiring entry; and a rear cord and rear electrical plug received in the first rear cavity and adapted to electrically connect to an electrical receptacle located inside of the footprint of the body with a through connector installed in the second wiring entry.

According to yet another aspect, a method of configuring an electric vehicle charging apparatus is provided. The method includes configuring an electrical connection to the at least one electrical terminal of the electric vehicle charging apparatus in one of a plurality of electrical power connection options, the plurality of electrical power connection options comprising an outside cord option wherein an outside cord and coupled outside electrical plug are adapted to electrically connect to an electrical receptacle located outside of a footprint of the body, and the outside electrical cord is received through the first wiring entry, and a rear receptacle mount option wherein a rear cord and coupled rear electrical plug are received in the first rear cavity and adapted to electrically connect to an electrical receptacle located inside of the footprint of the body wherein the rear electrical cord is received through the second wiring entry.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

DETAILED DESCRIPTION

Figure 1A:
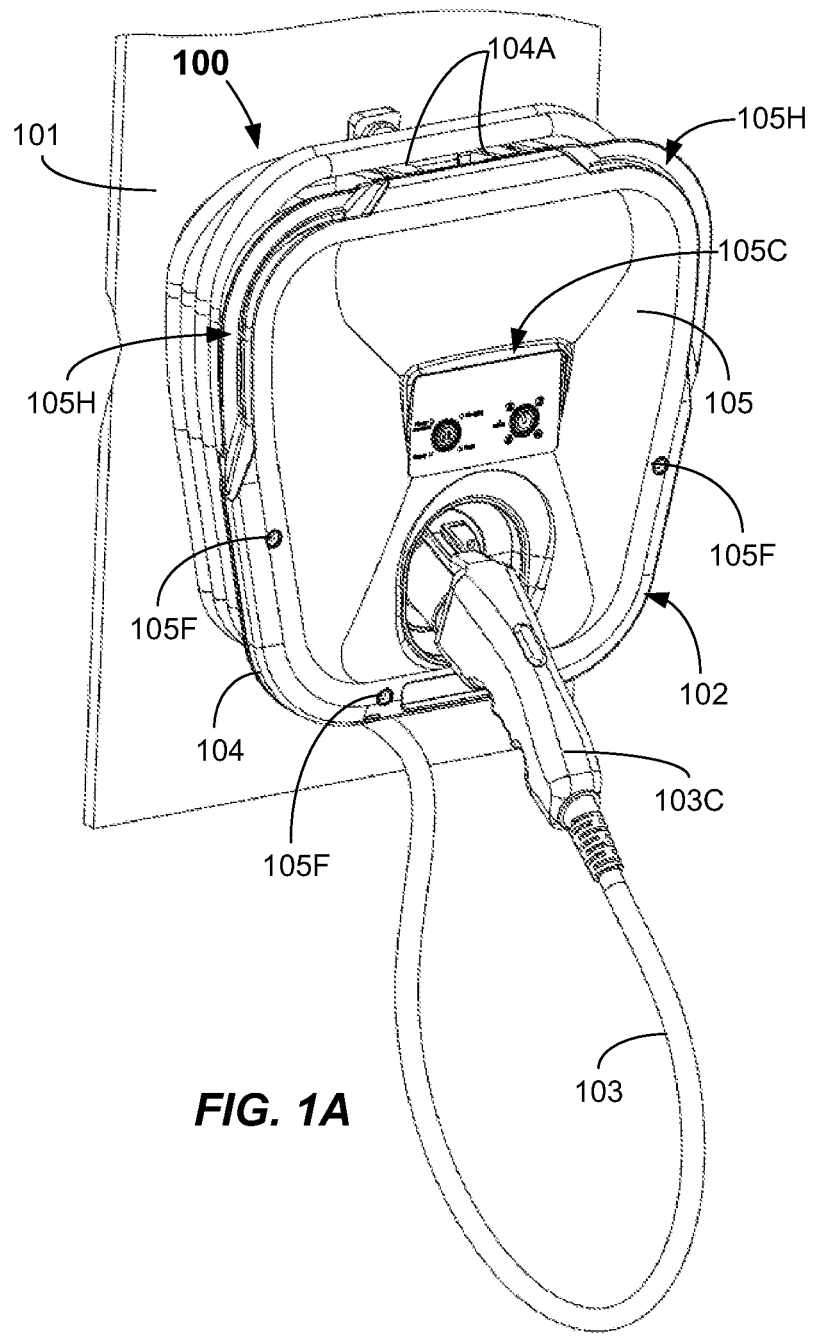
FIG. 1A illustrates a front isometric view of an electric vehicle charging apparatus mounted to a structure according to embodiments.

Reference will now be made in detail to the example embodiments of which are illustrated in the accompanying drawings. Wherever possible, the same reference numbers will be used throughout the drawings to refer to the same or like parts. The drawings are not necessarily drawn to scale.

One or more of the aforementioned problems of difficulty of installing the electric vehicle charging apparatus or slow charging rates are overcome by one or more embodiments of the present invention. In addition or alternatively, aspects of the invention allow enhanced user functionality and feedback. In particular, in a first aspect, mechanical and packaging considerations that make the product easier to mechanically and electrically install in the field are provided. According to one aspect of the present invention, up to four different electrical wiring options are enabled in a common housing configuration. Accordingly, a manufacturer or installer may easily configure the electric vehicle charging apparatus in one of up to four options by using the common housing configuration. In another aspect, an installer can readily adapt the installation in the field to the electrical wiring platform that is present at the installation location.

In one or more embodiments, the electric vehicle charging apparatus includes housing structural features and an outside cable and outside electrical plug allowing the electric vehicle charging apparatus to be installed as an "outside direct wire option" to a panel (e.g., a load center) or sub-panel box. In another embodiment, the electric vehicle charging apparatus includes housing structural features allowing the electric vehicle charging apparatus to be installed with an "outside cord option" having an outside cord and outside electrical plug and wherein the outside electrical plug is plugged into an electric outlet that is located adjacent to an exterior of the electric vehicle charging apparatus. In a third embodiment, the electric vehicle charging system includes housing structural features allowing the electric vehicle charging apparatus to be connected using a "rear direct wire option" wherein the electric vehicle charging apparatus is wired into and through a gang box located behind the electric vehicle charging apparatus. In yet another embodiment, the electric vehicle charging system includes housing structural features enabling a "rear receptacle mount option" wherein the electric vehicle charging apparatus is plugged into an electrical receptacle located behind the electric vehicle charging apparatus, such that it is able to hide the cord. Removable wire trough connectors and/or knockouts offer wire routing flexibility and allow for wire entrance from the bottom (or even the side or top), or at the rear of (e.g., behind) the electric vehicle charging apparatus. These flexible electrical wiring options offer a homeowner and/or installer more flexibility when installing or retrofitting an electric vehicle charging apparatus.

In another aspect, embodiments of the present invention enable various mechanical mounting styles that allow for flexibility in the mechanical connections to a structure, such as a stud, wall, post, pedestal, or the like. One or more embodiments provide a fast mounting bracket that allows the installer to mount the electric vehicle charging apparatus while allowing free hands for making electrical connections.

In another aspect, embodiments of the present invention enable improved feedback of a status of the electric vehicle charging apparatus. For example, light guide assembly may generate and display one or more colors and/or flashing lights on a light exit region that indicate a status of the electric vehicle charging apparatus to the user at a distance. Status such as charge status, charge completeness, readiness to charge, fault, fault condition/type, charge time delay, pause, indicating remote access, or the like may be displayed.

Embodiments of the invention will be explained in greater detail with reference to FIGS. 1A-6 below.

Figure 5A:
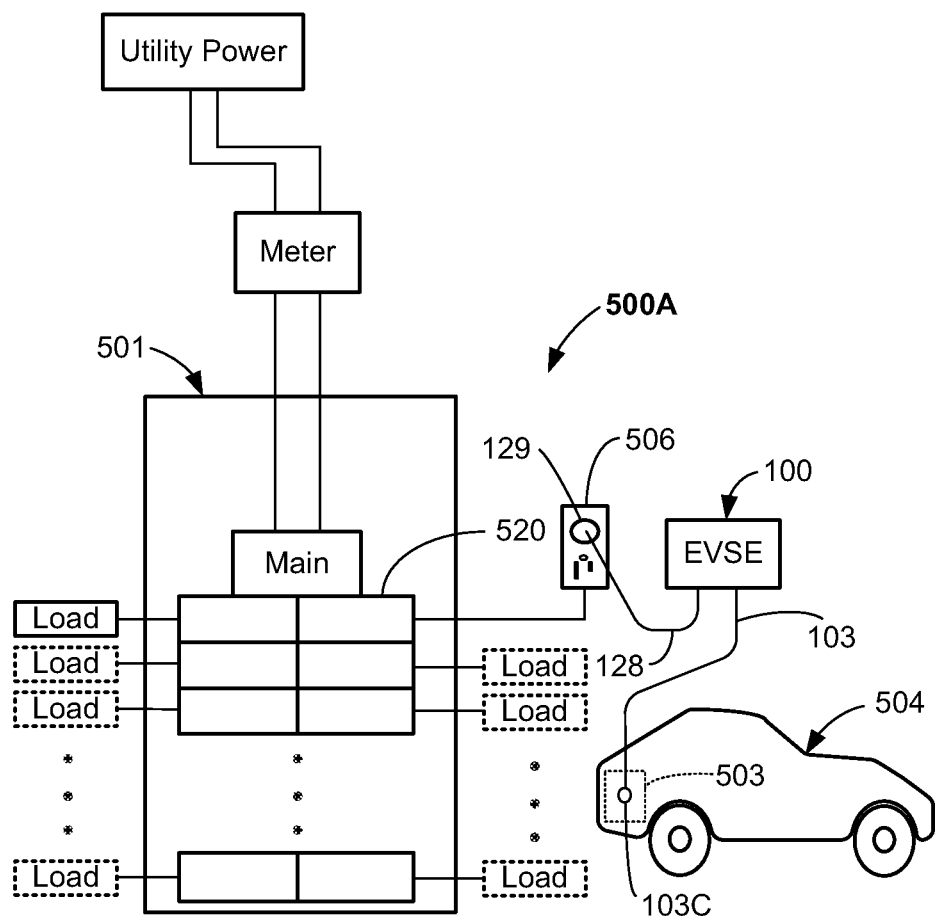
FIG. 5A is an electrical block diagram of an electrical system including an outside cord option of electrical connection of the electric vehicle charging apparatus according to embodiments.
Figure 5B:
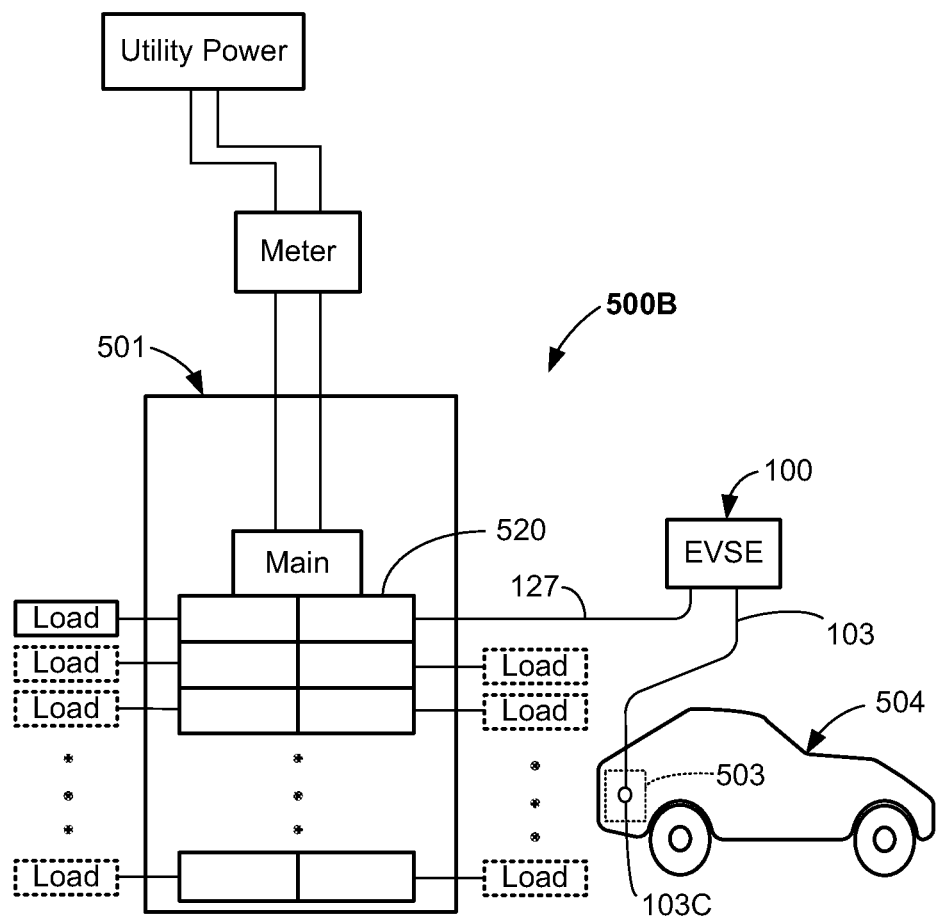
FIG. 5B is an electrical block diagram of an outside direct wire option of electrical connection of an electric vehicle charging apparatus according to embodiments.
Figure 5C:
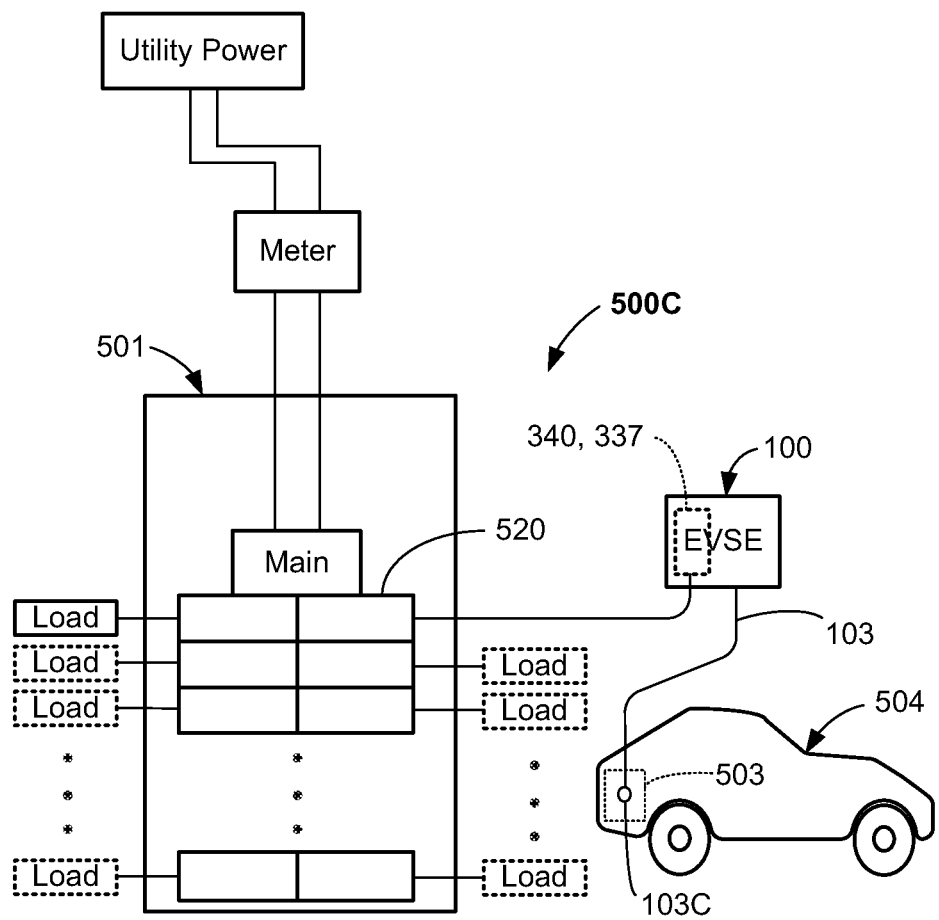
FIG. 5C is an electrical block diagram representing both of a rear receptacle mount option or a rear direct wire mount option of an electric vehicle charging apparatus according to embodiments.

FIG. 1A illustrates an embodiment of an electric vehicle charging apparatus 100 being mounted to a structure 101, such as a wall. The electric vehicle charging apparatus 100 receives electrical power from an electrical power supply system or component by electrically connecting to a residential panel box, sub-panel box, electrical gang box, or electrical receptacle (e.g., an electrical outlet) or the like and electric vehicle charging apparatus 100 is adapted to charge an electric vehicle 504 (FIGS. 5A-5C). The electric vehicle charging apparatus 100 includes a housing 102, which may be a multi-piece housing, and which may be configured and adapted to allow multiple electrical connection options, as well as multiple mechanical fastening options (e.g., mounting options). The housing 102 may be mounted to any suitable structure 101 such as a wall, stud, post, pedestal, or the like. Multiple mounting methods and electrical connection method options may be used, as will be described herein.

The housing 102 may have a body 104 and a lid 105 coupled to the body 104. The lid 105 may be removable or hinged by one or more hinges 104A to the body 104, such as at a top thereof. The lid 105 may include a latch or other securing features, such as one or more fasteners 105F (e.g., screws) to fasten the lid 105 to the body 104. The electric vehicle charging apparatus 100 includes a charging cable 103 and an electrical connector 103C that is adapted to couple to a mating connector located on the electric vehicle 504 (FIGS. 5A-5C). In the depicted embodiment, the electrical connector 103C may be mounted for easy access on a front mounting post 105P (FIG. 1B) formed on the housing 102, such as on lid 105. The housing 102 may have a suitable shape such that the charging cable 103 may be wrapped about a periphery of the housing 102 one or more times and may include a housing lip that is adapted to provide a channel in conjunction with the structure 101 to retain the charging cable 103 within bounds, much like a hose reel. The body 104 may be made of a plastic material, such as a highly flame-retardant plastic material (e.g., a glass-filled, highly flame-retardant polyester material). Other suitable highly flame-retardant materials may be used. However, in one or more embodiments, the lid 105 may be made from a more attractive plastic, such as a non-flame retardant or mildly flame-retardant plastic (e.g., colorable plastic such as a polycarbonate plastic). Other suitable materials may be used.

The one or more hinges 104A may allow relatively free rotation of the lid 105 relative to the body 104, and may include a suitable mechanism (not shown) for locking the lid 105 in an opened position. A suitable flexible seal may be provided around the periphery or the body 104 or lid 105 and located at the intersection thereof in order to seal the internal portions and cavities of the electric vehicle charging apparatus 100 such that outside use, i.e., exposure to rain and weather is possible.

The electric vehicle charging apparatus 100 may include a control panel 105C that may be located on the lid 105. The control panel 105C allows the user to select various items, such as pause and delay time via pressing one or more buttons on the control panel 105C. Additionally, status indicator lights may be displayed on the front of the lid 105 next to indicia (e.g., Power Available, Ready, Charging, Fault, Delay Time, or the like). Other indicia may be used. Additionally or alternatively, the electric vehicle charging apparatus 100 may include a light guide assembly that is adapted to display one or more colors, one or more flashing lights, or combinations at one or more light exit regions 105H (e.g., at one or more halos). These halos are large enough so that they may be readily viewed from across a room (say at 15 feet or more). The halos may extend about some or all of the housing 102.

Various electrical installations of the electric vehicle charging apparatus 100 may be achieved according to one or more embodiments of the invention. Several installation embodiments are shown in FIGS. 5A-5C. As installed, the electric vehicle charging apparatus 100 comprises at least one of the electrical loads that are electrically connected to the electrical supply system 500A-5000. The number of loads may be as many as allowed by the load center 501, and/or any sub-panel electrically coupled thereto. Each electrical load may be protected by its own circuit breaker, and such circuit breakers may have amperage ratings of between about 10 A and about 125 A, for example. One of the electrical circuit branches may include an electrical load, which is the electric vehicle charging apparatus 100.

The electric vehicle charging apparatus 100 is adapted to supply an electrical current output to charge an electrical power source 503 (e.g., a battery pack) of an electric vehicle (EV) 504. In the depicted embodiments herein, the charge may be at about 220V. Accordingly, a much more rapid charge may be achieved. The power may be supplied to the EV 504 by the charging cable 103 having the electrical connector 103C electrically coupling to a receiving connector on the EV 504. The electric vehicle charging apparatus 100, as shown in FIG. 5B may include an "outside direct wired option" and may be wired directly to a circuit breaker 520 in a main load center 501, or to a sub-panel (not shown) electrically coupled to the main load center 501, such as through a conduit 127 (See FIG. 1B), shown as a bottom feed conduit. The conduit 127 may be a typical metal or PVC conduit and may protrude out of a lower or other portion of the electric vehicle charging apparatus 100. To complete this installation, an electrical cable 131 (e.g., 10-3 cable) runs through the conduit 127 and through a first wiring entry 116. The first wiring entry 116 may be formed by removing a knock out or a replacement plug. In the case of a replacement plug, which may be a sealed plug, the replacement plug can be swapped to another location within the electric vehicle charging apparatus 100 when reconfiguring the electrical connection (e.g., in the field). The wires of the outside electrical cable 131 may be run up to the one or more electrical terminals 107 on the inside of a first front cavity 106 and connected to the at least one electrical terminal 107. The at least one electrical terminal 107 is a common end point for all the wiring options discussed herein.

In another embodiment, as shown in FIG. 5A, the electric vehicle charging apparatus 100 may be plugged directly into an electrical receptacle 506 that is electrically coupled to the circuit breaker 520. The electric vehicle charging apparatus 100 may include an outside electrical cord 128 and a suitable outside electrical plug 129, such as a 240 V NEMA plug. Other plugs may be used. Thus, in this embodiment, the electric vehicle charging system 100 is wired with an outside cord option and powered through the outside electrical cord 128 and outside electrical plug 129 which provides excellent flexibility regarding installation location of the electric vehicle charging apparatus 100. The term "outside" as used herein denotes a position outside of a footprint of the electric vehicle charging apparatus 100, i.e., external to, but not behind the electric vehicle charging apparatus 100.

In another embodiment, shown in FIG. 5C, the electric vehicle charging apparatus 100 is shown wired to a rear electrical receptacle 340 via a rear receptacle mount option or to a gang box 337 (both shown dotted) located behind the electric vehicle charging system 100, i.e., each within the footprint of the electric vehicle charging apparatus 100. These electrical configurations and installations and the details of the electric vehicle charging apparatus 100 enabling these various electrical power installations will now be described with reference to FIGS. 1A-3D.

FIGS. 1A through 1F illustrate the components and several different installation embodiments of an electric vehicle charging apparatus 100. Referring to FIGS. 1C-1F, the body 104 may include a number of internal cavities. A first front cavity 106 of the body 104 (e.g., at a lower section of the electric vehicle charging apparatus 100) may contain at least one electrical terminal 107. The at least one electrical terminal 107 may be a lug, lug assembly, quick connect, terminal block, or the like. In the depicted embodiment, a line terminal block 107A and a grounding terminal block 107B are shown. Other electrical terminal options may be used.

The lower section of the electric vehicle charging apparatus 100 has been designed to properly route and terminate the various electrical connection options. FIGS. 1C and 1D illustrate an interior flexible wiring compartment as a first front cavity 106 easily assessable by removing or rotating the lid 105 out of the way. This first front cavity 106 may be appropriately sized to house either a single phase or a three phase wiring system, such as with an earth ground. FIG. 1D illustrates one of the flexibility features, and illustrates an interchangeable lug interface or terminal 107. The electrical terminal 107 (providing an electrical connection between the incoming wires and electrical components of the electric vehicle charging apparatus 100) may be mounted on threaded inserts in the plastic molding, for example. This lug interface or terminal 107 may be fastened to the threaded inserts by one or more suitable fasteners. Various alternative lug interfaces or terminal designs or types can be selected and utilized on a common mounting platform within the first front cavity 106. Some examples include lug or terminal designs intended for US application, and an alternative lug or terminal design for IEC application. In a similar manner, these lug interface or terminals 107 can be swapped between single and 3 phase setups by adding additional modules into the lug interface.

The body 104 may also include a second front cavity 108 (e.g., at an upper portion) that is adapted to house and contain high voltage components, such as a contactor 109 and one or more printed circuit boards. The contactor 109 in the second front cavity 108 may be electrically coupled to the at least one electrical terminal 107, and also to the charging cable 103. The contactor 109 may have a rating of 10-100 amperes. The printed circuit board may receive a low voltage (e.g., less than about 24 V) from a low voltage supply electrically coupled to the contactor 109.

Furthermore, various signal or data line inputs/outputs may be provided to and/or from the printed circuit board via one or more low voltage terminal blocks 112 located in the first front cavity 106. Optionally, an Ethernet terminal 114 (shown dotted in FIG. 1C) may be provided in the first front cavity 106 and may be adapted to connect an Ethernet cable to the printed circuit board. In this way, access to low voltage components is through the first front cavity 106 via removing or opening the lid 105. A removable plug 115 in the first front cavity 106 may be used to receive a hard wired connection from the rear of the unit to the one or more low voltage terminal blocks 112 and/or the Ethernet terminal 114. In this manner data communication with a home network cable (e.g., a CAT5e or similar cable), a utility service communication cable, other communication cable, or the like may be provided. For example, in one or more embodiments, a status of the electric vehicle charging apparatus 100 (e.g., powered, faulted, charging, charged, delayed, or the like) may be remotely monitored. In one or more embodiments, the utility service may monitor and/or remotely shut down the electric vehicle charging apparatus 100 during periods of high electrical demand. Furthermore, the electric vehicle charging apparatus 100 may be locked via a remote signal through the one or more low voltage terminal blocks 112 or the Ethernet terminal 114.

In more detail, the first front cavity 106 and second front cavity 108 may be separated by dividing wall 110. The dividing wall may extend between the sides of the body 104. Hot(s), neutral, and ground conductors pass through a small opening in the dividing wall 110 and may be connected to the contactor 109. A filter 111 may function to reduce the transmission of specific signal frequencies (e.g., RF) from the home and to prevent the transmission of signals from the car to the home, for example. The filter 111 may be positioned so as to physically block and/or partially fill the small opening between the cavities 106, 108. As shown, a first wiring entry 116 is provided on the periphery of the body 104, such as at a bottom thereon. This first wiring entry 116 connects directly into the first front cavity 106, and may be a circular hole as shown in FIG. 1D. The first wiring entry 116 may have a diameter of between about 12 mm and 65 mm, or even between 30 mm and 50 mm, for example. Other sizes may be used.

Figure 1B:
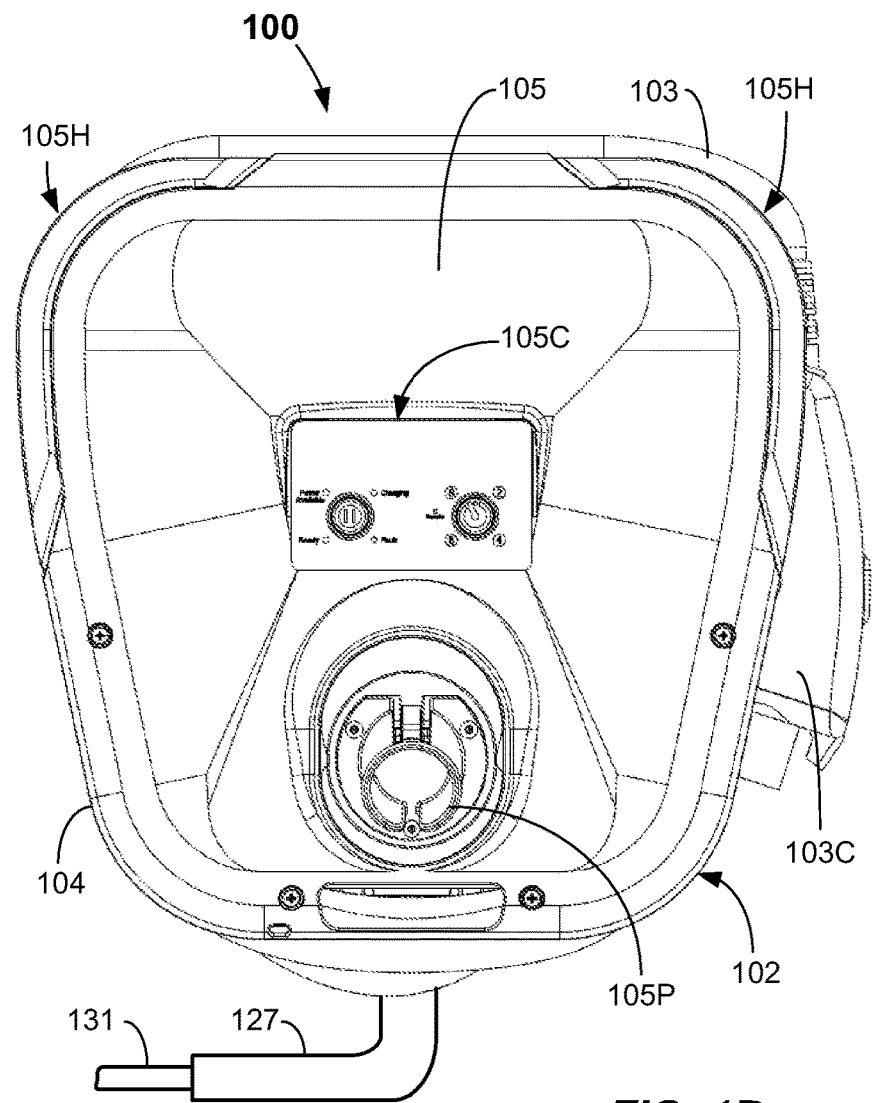
FIG. 1B illustrates a front view of a housing and an outside direct wire option of electrical connection of an electric vehicle charging apparatus according to embodiments.
Figure 1C:
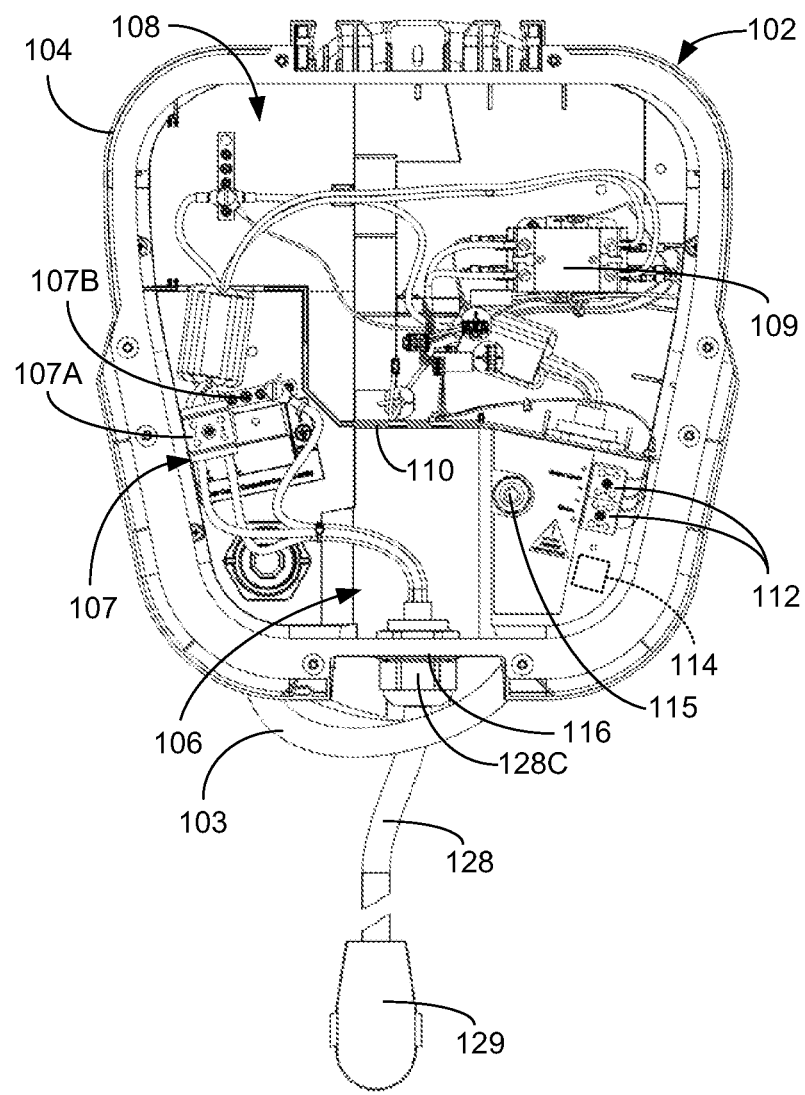
FIG. 1C illustrates a front view of a housing and some internal components and an outside cord option of electrical connection of an electric vehicle charging apparatus according to embodiments.
Figure 1D:
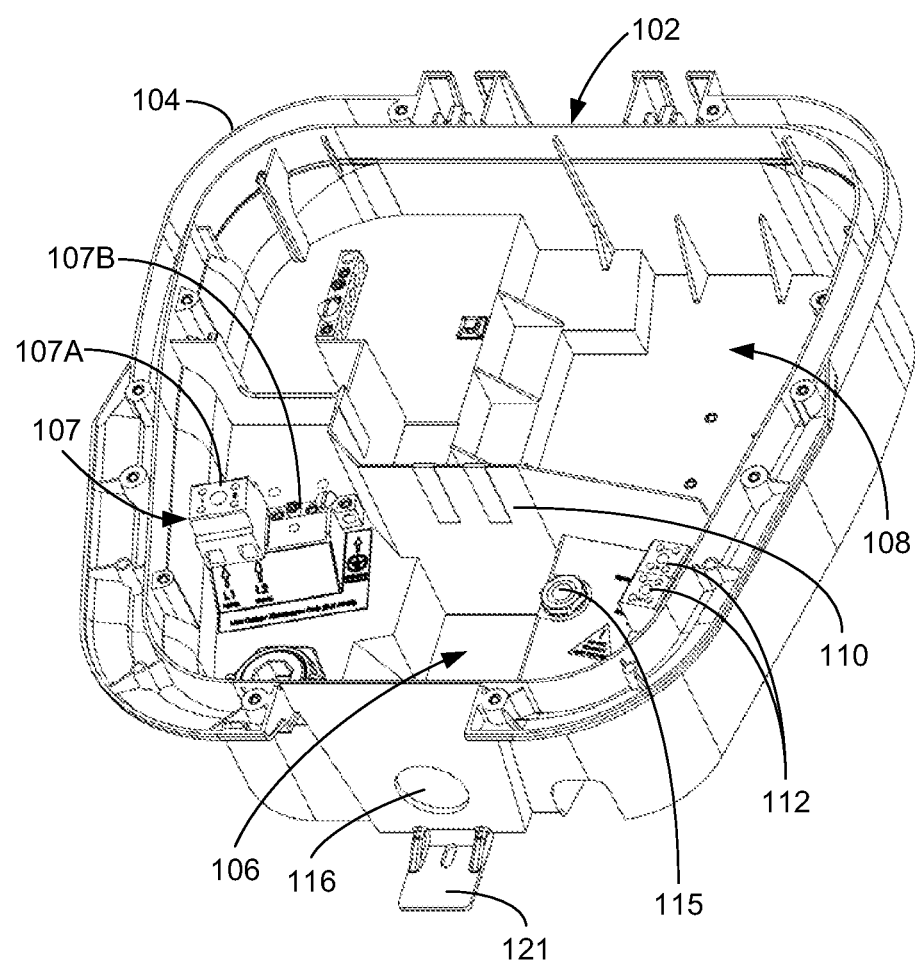
FIG. 1D illustrates an isometric front view of a housing of an electric vehicle charging apparatus including at least one high-voltage electrical terminal and at least one low-voltage electrical terminal according to embodiments.
Figure 1E:
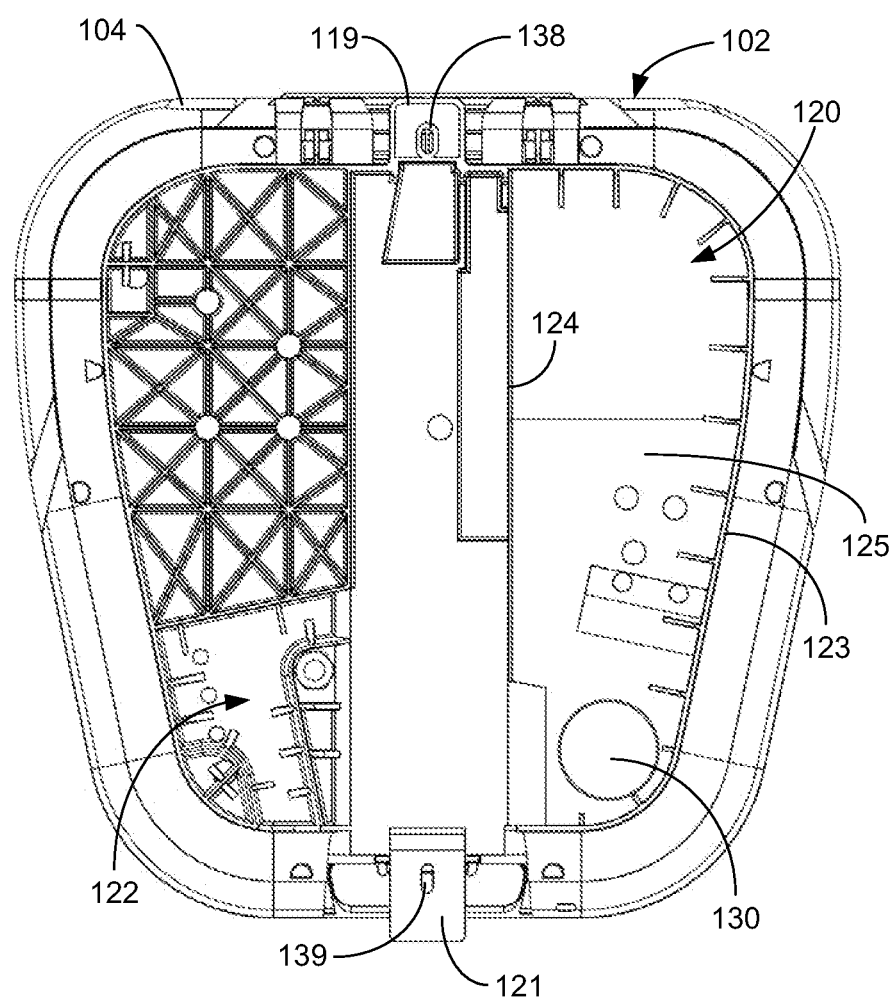
FIG. 1E illustrates a rear plan view of a housing of an electric vehicle charging apparatus according to embodiments.
Figure 1F:
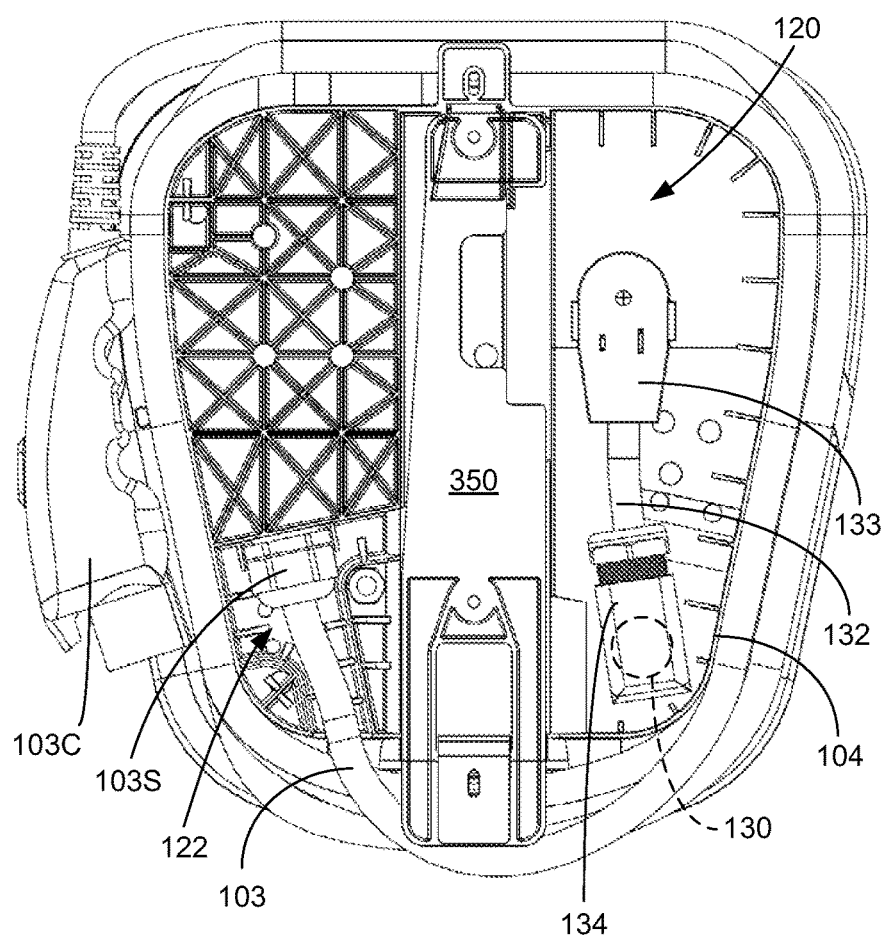
FIG. 1F illustrates a rear plan view and a rear receptacle mount option of electrical connection of an electric vehicle charging apparatus according to embodiments.
Figure 1G:
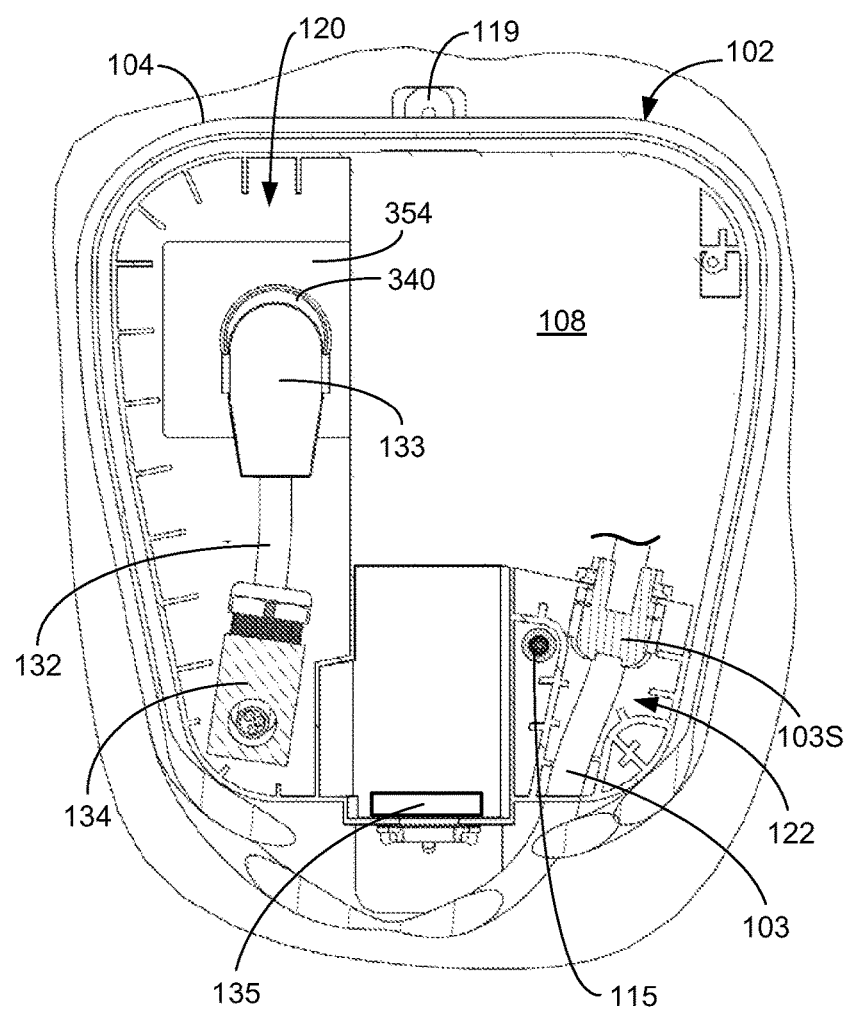
FIG. 1G illustrates a rearward looking sectional view of an electric vehicle charging apparatus configured as a rear receptacle mount option with the rear electrical plug received in an electrical receptacle within a footprint of the electric vehicle charging apparatus according to embodiments.

As shown in FIG. 1E, the body 104 of the housing 102 includes a first rear cavity 120, and may include a second rear cavity 122. The body 104 may include mounting features adapted to mount the electric vehicle charging system 100 to a structure 101. The mounting features may include an upper housing mounting feature 119 and a lower housing mounting feature 121, which may be molded tabs, for example. The first rear cavity 120 may be positioned on one side of the body 104 and may extend from a top to a bottom of the body 104, for example. Other configurations are possible. The first rear cavity 120 may be at least partially formed by an outer sidewall 123, an inner sidewall 124, and an intermediate wall 125. The other side of the intermediate wall 125 forms part of the first front cavity 106 and second front cavity 108. As shown in FIGS. 1F-1G, the second rear cavity 122 may be configured and adapted to receive the charging cable 103 and a through connector 103S. The through connector 103S may be a sealed through connector.

In one outside direct wired option, as shown in FIG. 1B, a conduit 127 (e.g., PVC or metal tubing) may be used to carry a conductor 131 (e.g., standard 10-3 electrical conductor or the like) to a panel box or sub-panel box. In another embodiment, the conduit 127 may extend to an underground location (e.g., where the conductor 131 may be a direct-burial conductor). In other embodiment, the conduit may pass through a wall, and then to a panel box, or the like. The first wiring entry 116 may optionally be located on a peripheral side of the body 104, but still for direct connection into the first front cavity 106.

Optionally, as shown in FIG. 1C, first wiring entry 116 may receive an outside electrical cord 128 with coupled outside electrical plug 129 (e.g., a NEMA plug) that is adapted to plug into a nearby electrical receptacle 506 (See FIG. 5A). The electrical receptacle 506 may be protected by a suitable ground fault circuit interrupter (GFCI). The outside electrical cord 128 and outside electrical plug 129 may be adapted to carry 220V, for example. The outside electrical plug 129 may be an external 240 V dryer plug in some embodiments. As shown in FIG. 1C, any suitable connector 128C may be used to rigidly secure and pass the outside cord 128 into and through the first wiring entry 116. In particular, the connection through the first wiring entry 116 may be a sealed connection.

Again referring to FIG. 1E, a second wiring entry 130 may be provided. The second wiring entry 130 may be a hole and may provide a path between the first rear cavity 120 and the first front cavity 106 containing the one OF more electrical terminals 107. The second wiring entry 130 may be the same size the first wiring entry 116 in some embodiments, so that the sealed plugs 135 may be interchangeable therein. In one rear receptacle mount installation option embodiment, as shown in FIG. 1F, a suitable rear cord 132 with attached rear electrical plug 133 (e.g., a NEMA plug) may be received in the first rear cavity 120 and the rear plug 133 may be configured and adapted to be plugged into a receptacle 340 (e.g., a wall receptacle 340) that is hidden behind the body 104 and within its footprint (see FIG. 1G, for example). Within the footprint means that the receptacle 340 is entirely hidden when looking from a front view orientation. The second wiring entry 130 may receive a through connector 134 that passes the rear cord 132 through the second wiring entry 130 and into the first front cavity 106 for electrical connection to the at least one electrical terminal 107. The through connector 134 may be a sealed connector so that the rear wiring entry 130 into the front cavity 106 is entirely sealed. The first wiring entry 116 may be closed with plug 135 in this embodiment. Plug 135 may be a removable plug, and may also be a sealed plug, for example. Optionally, the rear cord 132 may simply pass through the second wiring entry 130 and be connected to the at least one terminal 107 in the first front cavity 106, if a sealed environment is not needed. Optionally, a simple elastomer sealing grommet may be used. Also shown in FIG. 1G, is the charging cable 103 and the connection from the second rear cavity 122 through into the second front cavity 108 via connector 103S. The components in the second front cavity 108 are removed and the cable 103 is shown terminated for clarity.

Figure 1H:
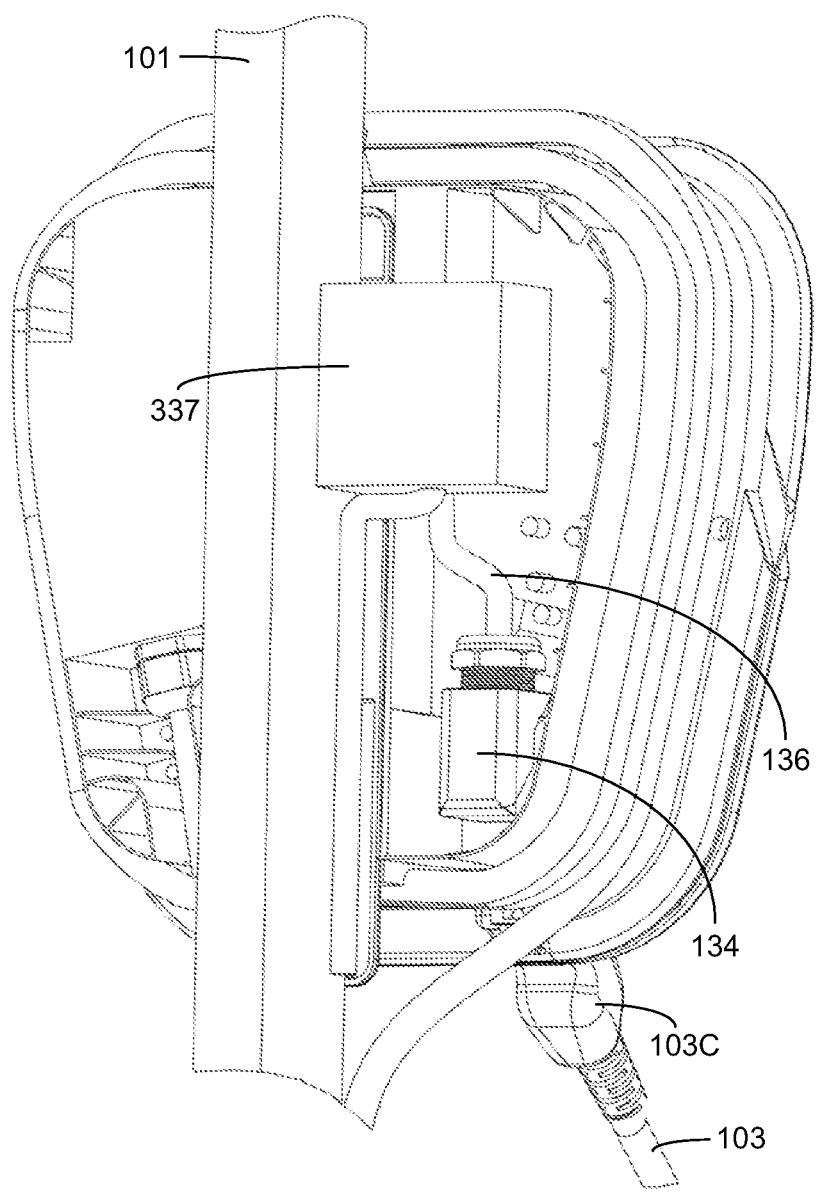
FIG. 1H illustrates an isometric rear view of an electric vehicle charging apparatus configured and mounted as a rear direct wire option according to embodiments.
Figure 3A:
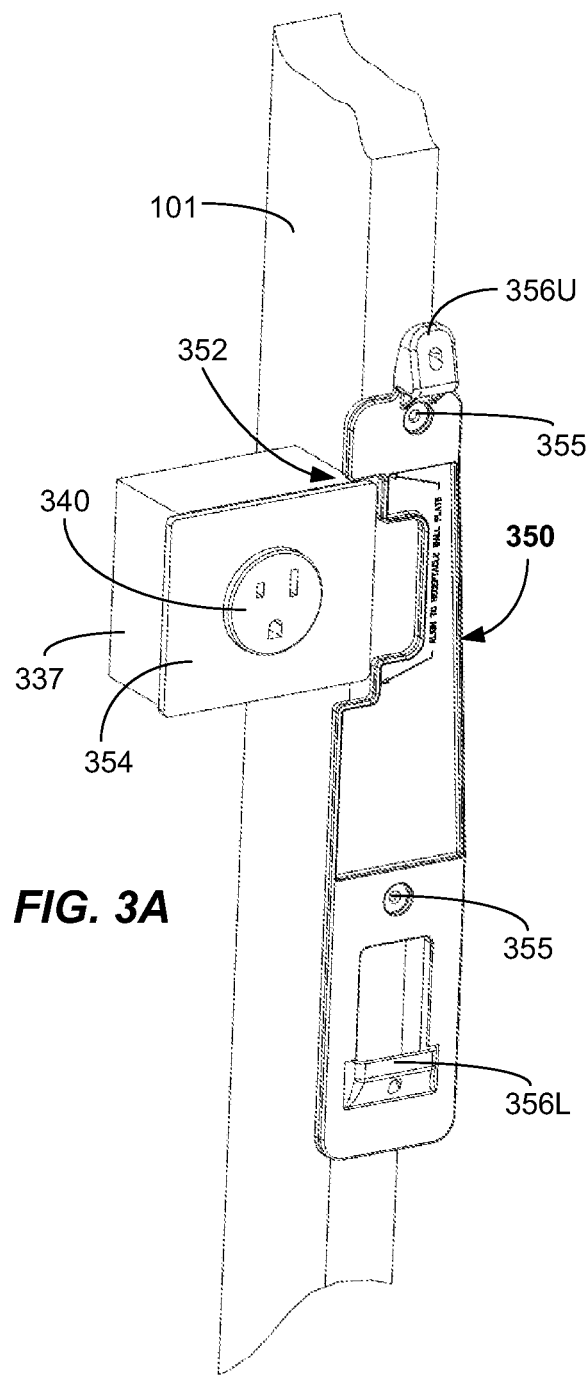
FIG. 3A illustrates an isometric view of a mounting bracket configured and adapted to register and mount an electric vehicle charging apparatus to a structure (e.g., framing stud or wall) for a rear receptacle mount option of electrical connection of the electric vehicle charging apparatus according to embodiments.
Figure 3B:
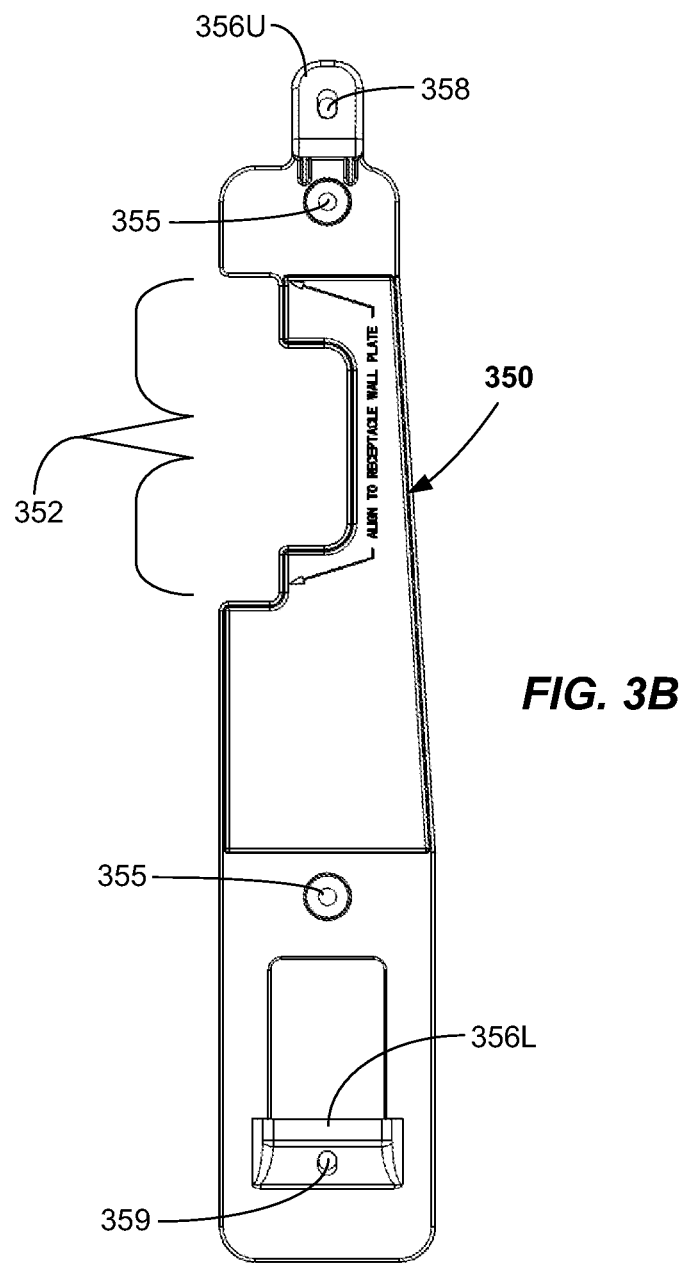
FIG. 3B illustrates a front plan view of a mounting bracket according to embodiments.
Figure 3C:
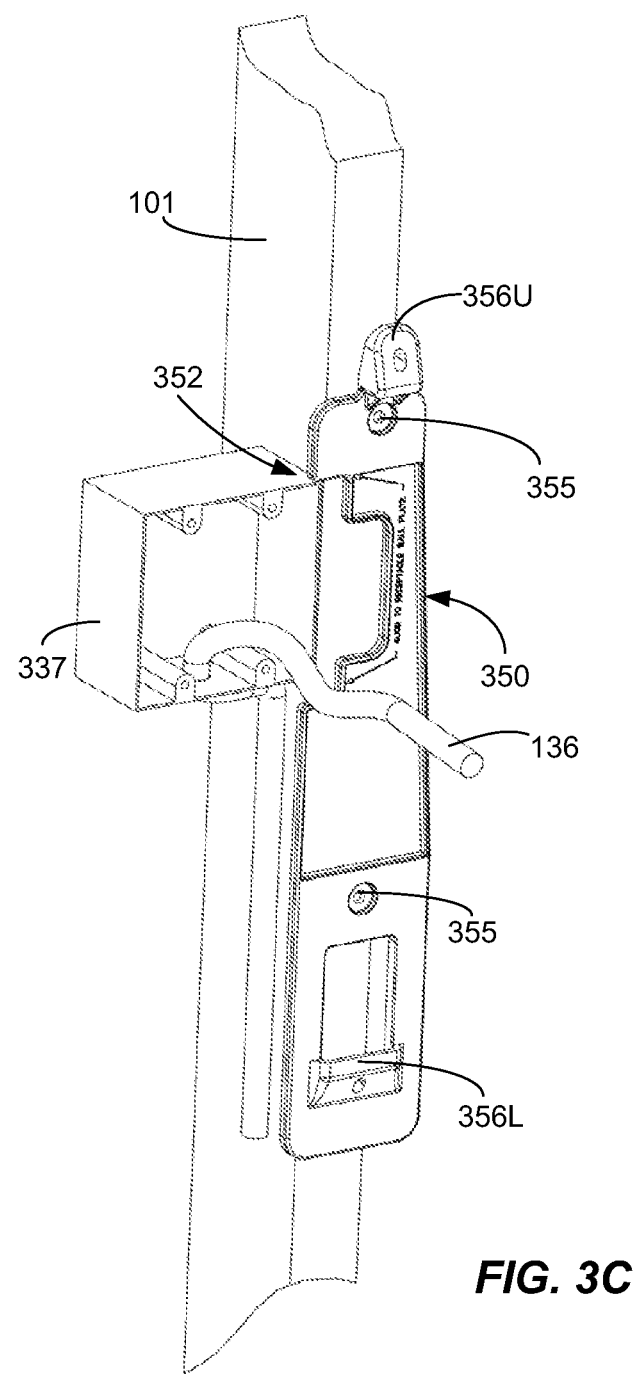
FIG. 3C illustrates an isometric view of a mounting bracket configured and adapted to register and mount an electric vehicle charging apparatus to a structure (e.g., framing stud, wall, pedestal, or post) for a rear direct wire option of electrical connection of the electric vehicle charging apparatus through a gang box according to embodiments.

In another installation option embodiment, as shown in FIG. 1H and FIG. 3C, a short length (e.g., 10-12 inches) of electrical conduit 136 (e.g., 10-3) from a gang box 337 that is mounted to a structure 101 may pass through the second wiring entry 130 and connect to the at least one electrical terminal 107 in the first front cavity 106. In this manner, the electric vehicle charging apparatus 100 may be direct wired into a rear located gang box 337 and the gang box may be entirely hidden behind the footprint of the electric vehicle charging system 100. Again, a sealed through connector 134 may be used to pass through the second wiring entry 130.

Thus, in all the embodiments described herein, the body 104 is structurally configured with a first wiring entry 116 and second wiring entry 130, the first front cavity, and the second front cavity 120 to provide a plurality of electrical power connection options for electrical connection of electrical power to the at least one electrical terminal 107. The plurality of electrical power connection options include, in summary:

1) an "outside cord option" wherein an outside electrical cord 128 and coupled outside electrical plug 129 are adapted to electrically connect to an electrical receptacle 506 located "outside of" a footprint of the body 104, wherein the outside electrical cord 128 is received through the first wiring entry 116 as shown in FIG. 1C and FIG. 5A;

2) an "outside direct wire option" wherein an outside electrical cable 128 is adapted to electrically connect to a load panel 501 or sub-panel, and wherein the electrical cable 131 is received through the first wiring entry 116 as shown in FIG. 1B and FIG. 5B;

3) a "rear receptacle mount option" wherein a rear electrical plug 133 is received in a first rear cavity 120 and is adapted to electrically connect to an electrical receptacle 340 located "inside of" a footprint of the body 104 as shown in FIGS. 1F-1G and FIG. 5C wherein the electrical cable 132 is adapted to pass through the second wiring entry 130; and 4) a "rear direct wire option" wherein a rear electrical cable 136 is adapted to electrically connect to a gang box 337 wherein the electrical cable 136 is adapted to pass through the second wiring passage 130 as shown in FIG. 1H and FIG. 5C.

Figure 2:
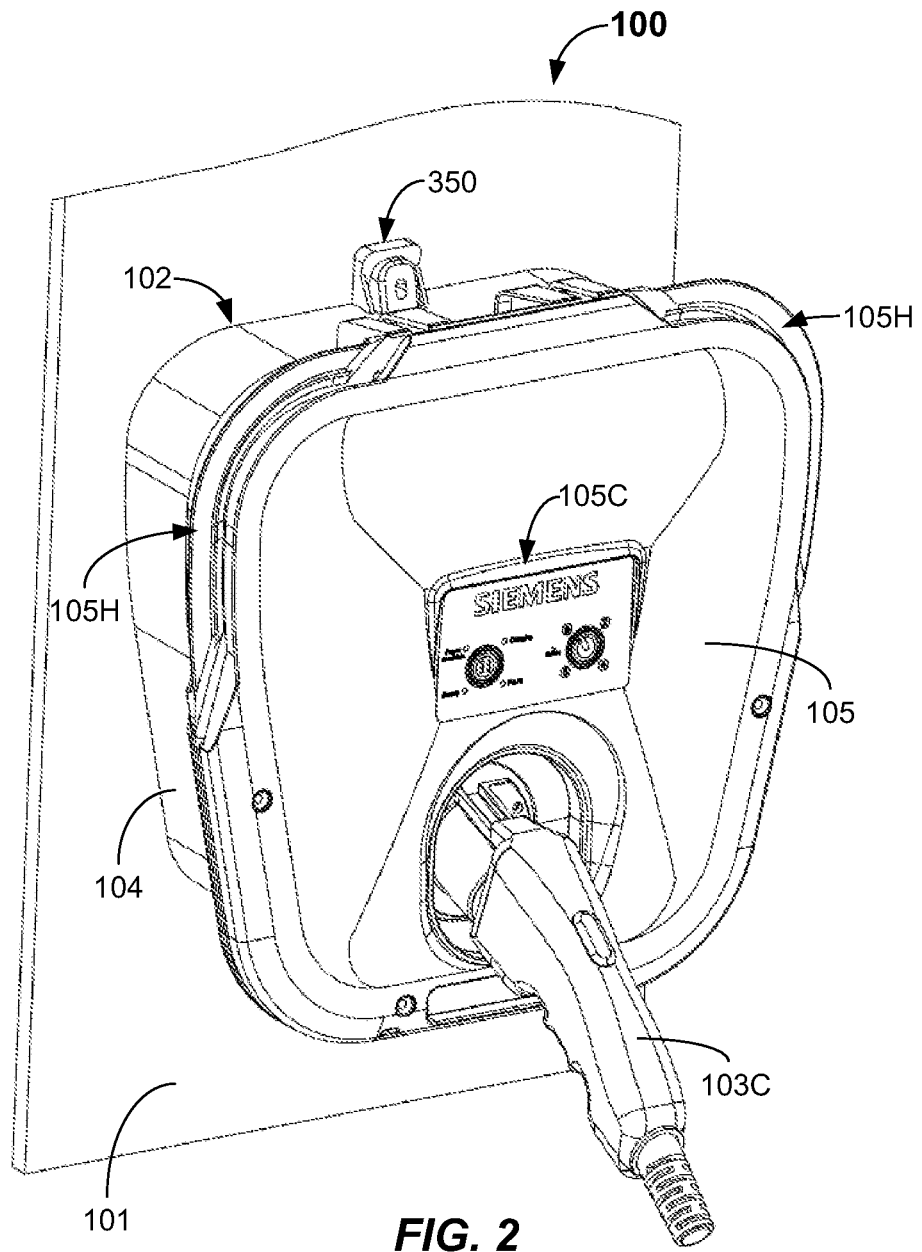
FIG. 2 illustrates an isometric front view of an electric vehicle charging apparatus with the charging cable removed (for clarity) according to embodiments.

FIG. 2 illustrates another embodiment of an electric vehicle charging system 100. In this embodiment, the electric vehicle charging system 100 may include either a rear receptacle mount configuration or a rear direct wired configuration. The charging cable 103 has been removed for clarity. The electric vehicle charging system 100 may include light exit regions 105H positioned on opposite sides of the housing 102 (See also FIGS. 4C, 4E and 4L) that may light up to indicate a status of the electric vehicle charging system 100, such as a charge or other operating condition.

FIGS. 3A-3D illustrates various example mounting embodiments utilizing a mounting bracket 350 for installation of an electric vehicle charging apparatus 100 to a structure 101. The mounting bracket 350 has a location feature 352 adapted to locate relative to an electrical receptacle 340, for example. The location feature 352 may be a cutout portion that may fit over and locate (e.g., register) on the cover 354 as shown in FIG. 3A, such as when the electric vehicle charging apparatus 100 is mounted to a structure 101 such as a wall or stud shown. Optionally, the location feature 352 may be a one or more marks on the bracket. Optionally, the location feature 352 may be adapted in use to be lined up with the cover 354, the gang box 337, the receptacle 340, or other geometrical feature. The mounting bracket 350 may have one or more installation features 355 adapted to install the mounting bracket 350 to the structure 101 (e.g., a wall, stud, pole, pedestal, or the like) such that the mounting bracket 350 may be mounted directly adjacent to the electrical receptacle 340. The installation features 355 may be apertures, slots, holes or other geometrical features formed in the mounting bracket 350 to accept fasteners, for example. Other types of mounting features 355 may be used.

The mounting bracket 350 may be made from a suitably rigid material, such as a Polyphenylene ether/polystyrene (PPE/PS) plastic. Other materials may be used. The mounting bracket 350 may be about 43 cm long and about 8 cm wide, for example. Other sizes may be used. Furthermore, the mounting bracket 350 may have an upper bracket mounting feature 356U adapted to receive and engage the upper housing mounting feature 119 of the housing 102 (See FIGS. 1E and 3D), and an lower bracket mounting feature 356L that is adapted to receive and engage the lower housing mounting feature 121. The upper bracket mounting feature 356U may be spaced a distance from a back surface of the mounting bracket 350 abutting the structure 101 so that the upper housing mounting feature 119 may slide between the upper bracket mounting feature 356U and the structure 101. Likewise, the lower mounting feature 356L is spaced from a back surface of the mounting bracket 350 so that the lower housing mounting feature 121 may slide between the lower mounting feature 356L and the structure 101.

Figure 3D:
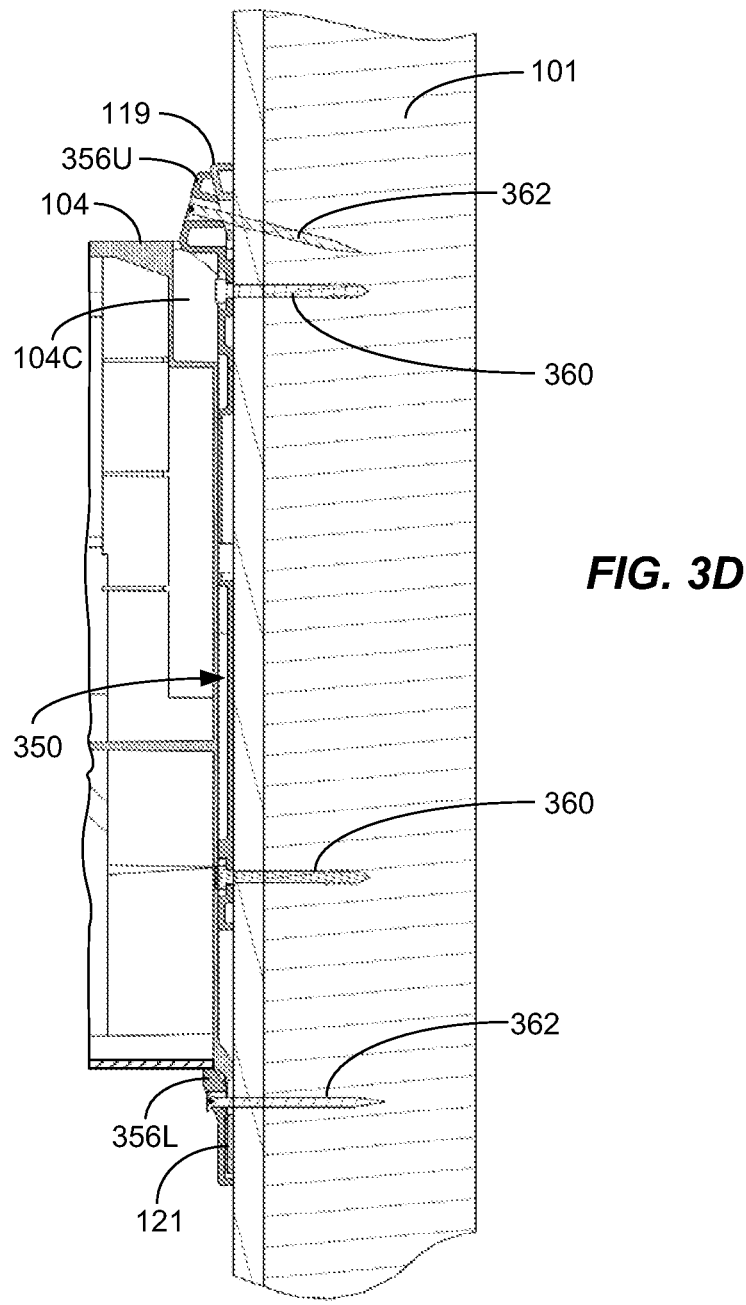
FIG. 3D illustrates a partial cross-sectioned side view of a mounting installation of a body of an electric vehicle charging apparatus onto a mounting bracket according to embodiments.

As installed, as shown in cross section in FIG. 3D, the mounting bracket 350 may first be mounted to the structure 101 via fasteners 360 such as with lag bolts, screws, nails, or the like. The electric vehicle charging apparatus 100 may then be hung on the mounting bracket 350 by offsetting the body 104 above the bracket 350 and sliding the housing mounting features 119, 121 behind the upper and lower bracket mounting features 356U, 356L. A suitable clearance space 104C may be provided in the back of the body 104 to allow clearance for the sliding.

For the rear receptacle mount option, the rear electrical plug 133 may be connected to the receptacle 340 and then the electric vehicle charging apparatus 100 may be hung on the mounting bracket 350. For the rear direct wire option, the electrical cable 136 (e.g., a 10-3 cable) may be passed through the second wire entry 130, such as by using a sealed through connector 134 (See FIG. 1H), and then the electric vehicle charging apparatus 100 may be hung on the mounting bracket 350 so that the installer may have both hands free to strip, prepare and connect the conductors of the electrical cable 136 to the at least one electrical terminal 107.

In the outside cord option, the electric vehicle charging apparatus 100 may be hung on the mounting bracket 350 and the outside electrical plug 129 on the outside cord 128 may be plugged into an adjacent receptacle 506 (FIG. 5A). For the outside direct wire option, the electric vehicle charging apparatus 100 may be hung on the mounting bracket 350, the conduit 127 mechanically connected to the body 104 by a coupling (e.g., a sealed coupling) and then the electrical cable 131 may be passed through the first wire entry 116. Also, in this option, the installer may have both hands free to connect the conduit 127 to the body 104, and the conductors of the outside electrical cable 131 to the at least one electrical terminal 107.

Once installed on the mounting bracket 350, the electric vehicle charging apparatus 100 may be secured to the bracket 350, or both the bracket 350 and structure 101 by suitable fasteners 362. For example, fasteners 362 such as long sheet rock screws may pass through the apertures 358, 359 (FIG. 3B) in the mounting bracket 350 and the apertures 138, 139 in the upper and lower mounting features 119, 121 (FIG. 1E) and into the structure 101. Optionally, the electric vehicle charging apparatus 100 may mount directly to the structure 101 by fasteners received through the upper and lower mounting features 119, 121 (FIG. 1E).

Figure 4A:
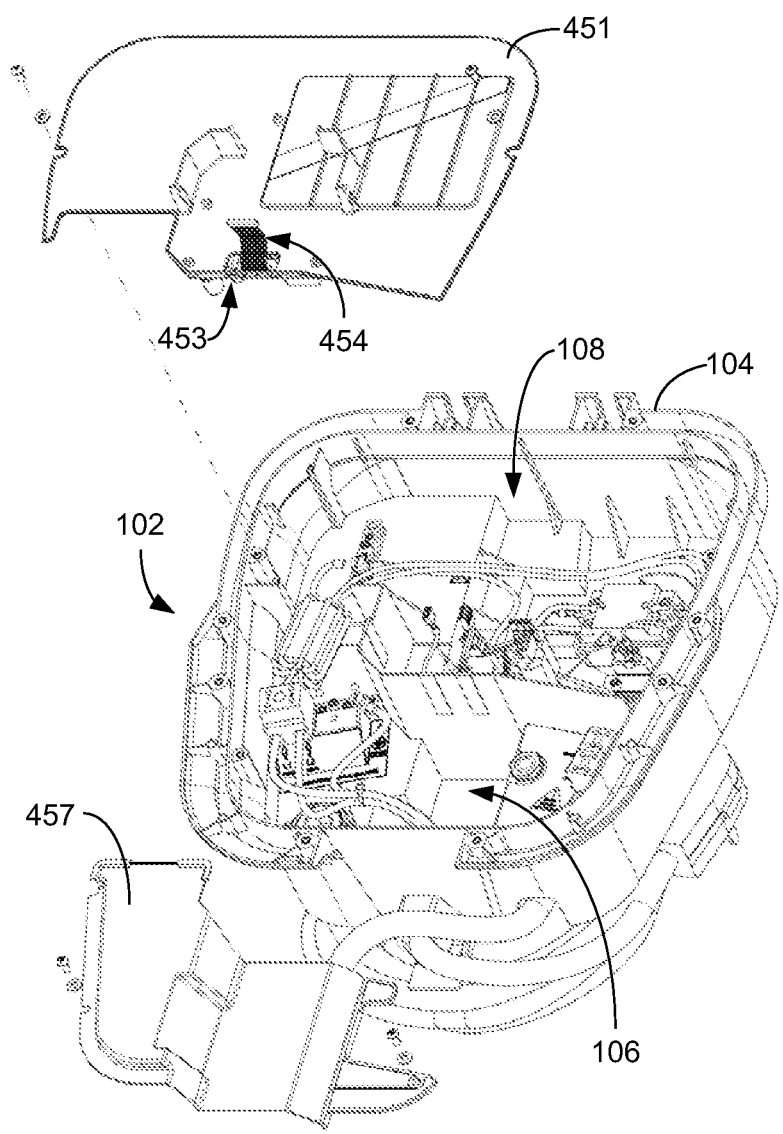
FIG. 4A illustrates a partial exploded view of a first inner cover and a safety cover of an electric vehicle charging apparatus according to embodiments.

FIG. 4A illustrates an isometric view of a body 104 of the housing 102 with a first inner cover 451 shown removed. The first inner cover 451 may be secured to and close the front of the second front cavity 108. A first printed circuit board 453 may reside on a rear side of the first inner cover 451 and may be connected thereto. The first inner cover 451 may be a suitable flame-rated plastic, such as described above. A second printed circuit board 456 (FIG. 4B) is connected to the printed circuit board 453 by a suitable cable, such as ribbon cable 454. The second circuit board 456 may be a low voltage circuit board. Also shown in FIG. 4A is a safety cover 457 that is adapted to be received in the first cavity 106 and covers the one or more electrical terminals 107 and protects the user from possible contact with high voltage shock hazards. The safety cover 457 may be manufactured from a highly flame-retardant plastic such as described herein, and may be fastened by screws or the like.

Figure 4B:
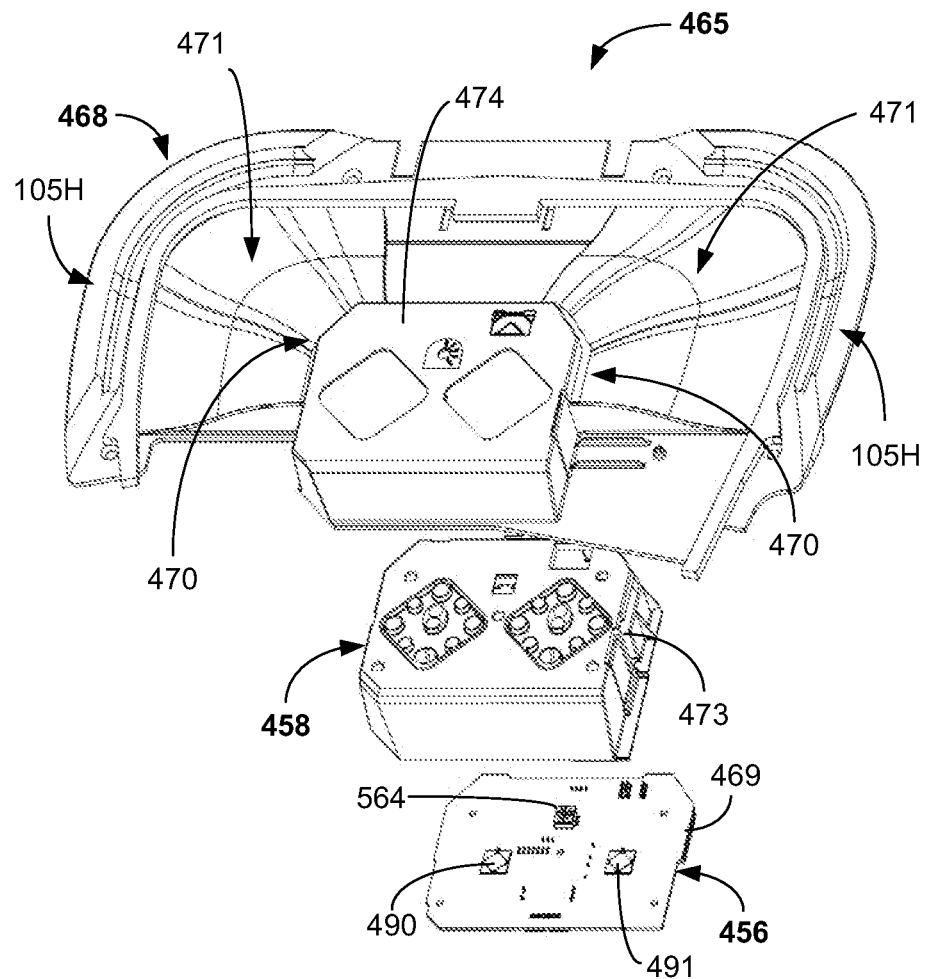
FIG. 4B illustrates a partial exploded view of several components of a light guide assembly of an electric vehicle charging apparatus according to embodiments.

FIG. 4B illustrates an exploded view of a light guide assembly 465. The light guide assembly 465 mounts to the body 104 (See FIGS. 4C and 4E) and may mount over the first inner cover 451. The light guide assembly 465 may include at least a light guide 468 and one or more light sources 469. In the depicted embodiment, the light guide assembly 465 includes a shield 458, and the second printed circuit board 456. The second printed circuit board 456 may include one or more light sources 469 mounted thereon or otherwise coupled thereto. The light sources 469 may be one or more LEDs, for example. The light sources 469 may emit light one or more colored light emissions. For example, the one or more light sources 469 may comprise white, green, red, blue, yellow, or any other color. The colors may be used to display a status of the electric vehicle charging apparatus 100.

For example, the colors may be used to convey at least one of ready to charge, a fault, a fault condition, an override condition (e.g., an override mode), an operational mode, a communication taking place, charging, charge status, charge completed, or the like. In one or more embodiments, green may indicate a ready to charge status. In one or more other embodiment, one or more colors may flash on and off to indicate a status, such as any one of the colors above. For example, a flashing green may signify a charging status, whereas continuous green may signify a completion of charging of the electric vehicle charging apparatus 100. Yellow may signify a 50% charge, for example. Red may indicate a fault mode. Blue may indicate an override condition, such as where the residential power service provider (e.g., utility company) shuts down the electric vehicle charging apparatus 100. Lights may flash in unison, or out of synchronism. Any combination of flashing lights and/or color emissions may be used.

Light from the one or more light sources 469 may be emitted and travel in the light guide 468. The light guide 468 receives the light at one or more light receiving areas 470 located adjacent to the one or more light sources 469, conveys the light along one or more light guiding regions 471, to one or more light exit regions 105H. The one or more light exit regions 105H may include an expansion zone, and may include a surface that is other than parallel with a direction of travel of the light emissions in the light guiding region 471.

Figure 4C:
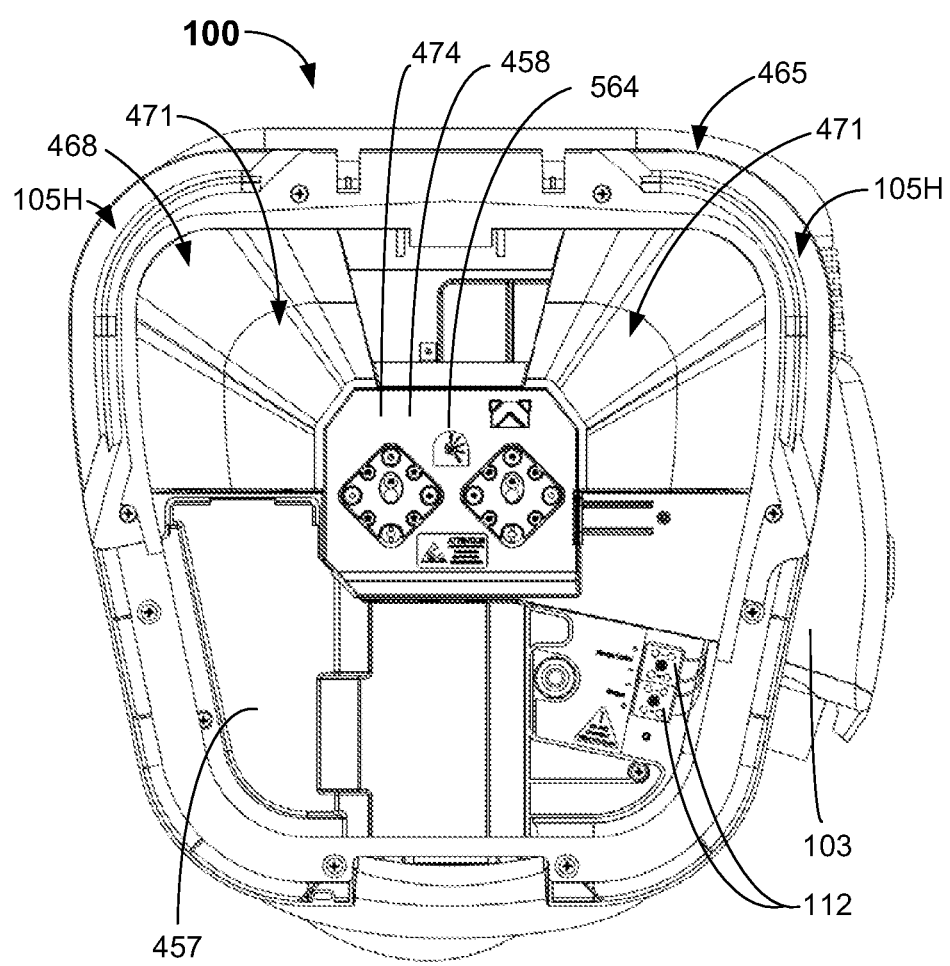
FIG. 4C illustrates a front plan view of various components of an electric vehicle charging apparatus with the hinged lid removed (for clarity) according to embodiments.
Figure 4D:
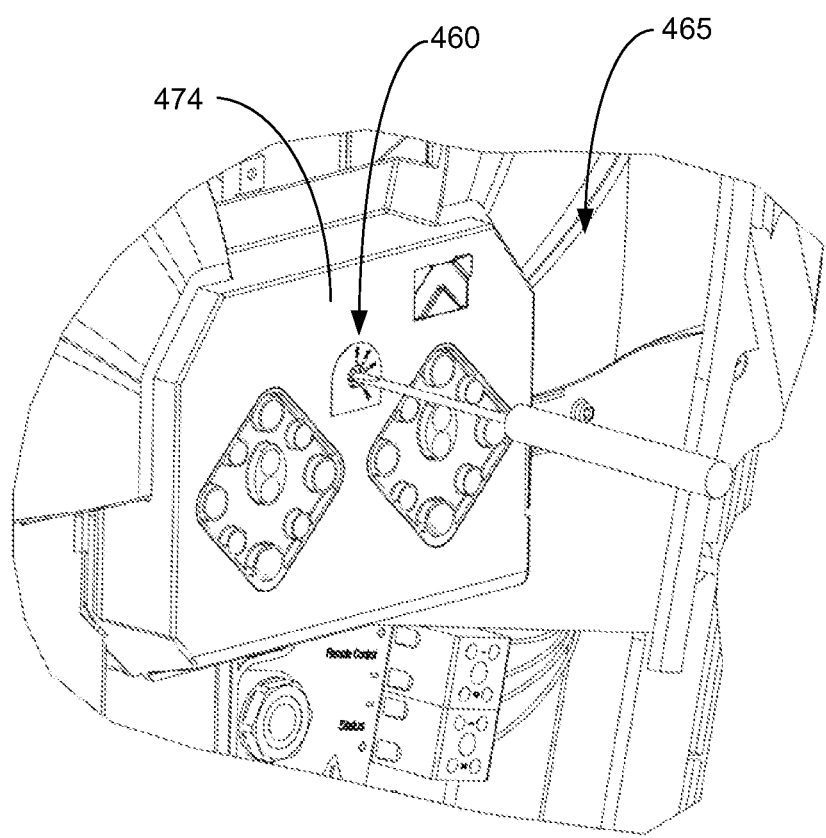
FIG. 4D illustrates a partial isometric view of a second inner cover, shield, and amperage set switch according to embodiments.
Figure 4E:
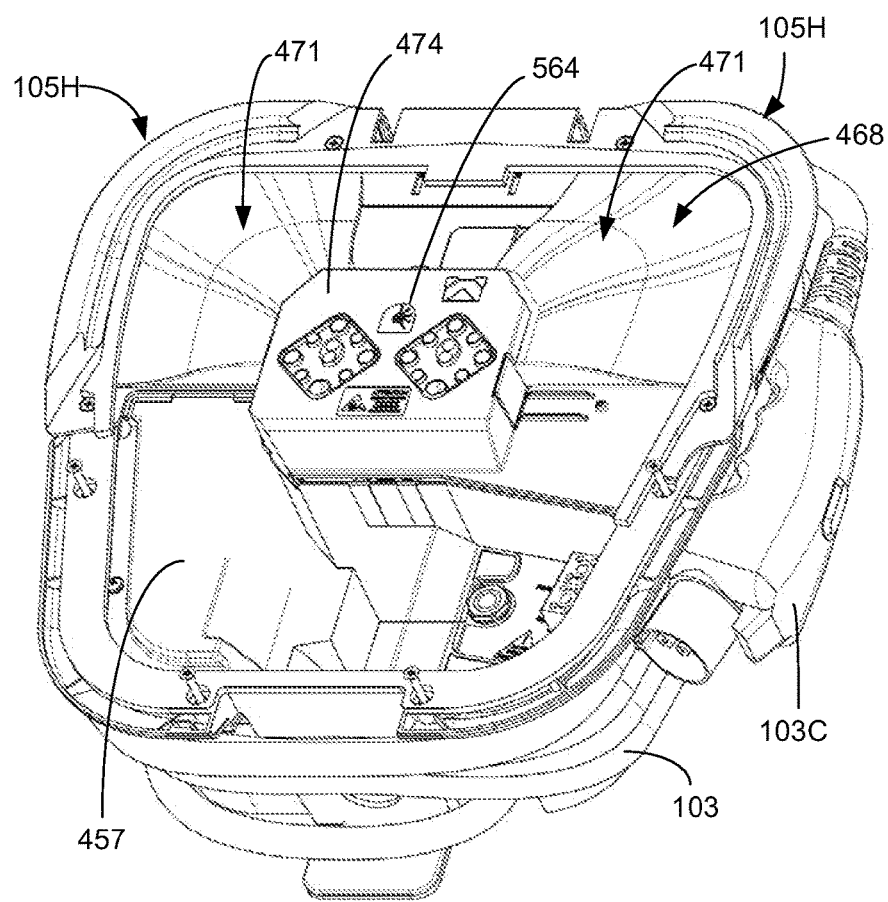
FIG. 4E illustrates an isometric view of an electric vehicle charging apparatus ready for a front direct wire option and with the lid removed according to embodiments.
Figure 4F:
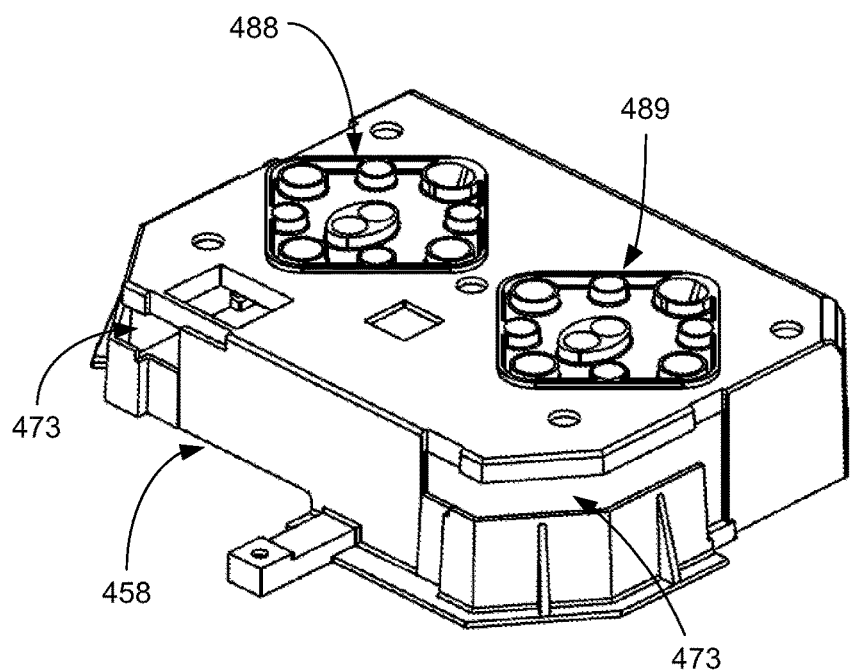
FIG. 4F illustrates an isometric view of a shield of a light guide assembly according to embodiments.
Figure 4G:
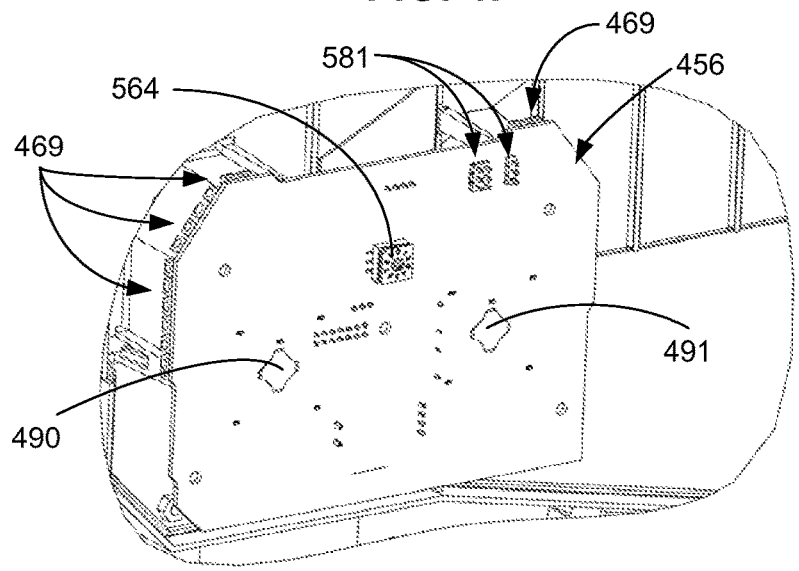
FIG. 4G illustrates an isometric front view of a printed circuit board according to embodiments.

In the depicted embodiment, as best shown in FIGS. 4F and 4G, the printed circuit board 456 is located and secured in a pocket just below the under surface of a shield 458. This PCB 456 may house the microcontroller 558 (FIG. 5D), light sources 469 such as side emitting light sources (LEDs) and front emitting LEDs. The light sources 469 (e.g., side emitting LEDSs) may emit light through one or more restrictive side apertures 473 formed in the shield 458. The restrictive side apertures 473 may be slots that may be vertically oriented (as installed). Light emissions are generated by the one or more light sources 469, may pass into the light guide 468 at the light receiving regions 470, channel light into the one or more light guiding regions 471, and emit light at the one or more light exit regions 105H. The light exit regions 105H may be positioned on one or more portions of the electric vehicle charging apparatus 100 so that they are viewable by a user.

In the depicted embodiment, the light exit regions 105H are positioned on opposite sides of the housing 102. The light exit regions 105H may include a roughened surface or other surface discontinuity that functions to scatter the light delivered thereat. The surface roughening may provide a frosted surface on some or all of the light exit regions 105H. The surface may be rougher than a surface of the light guiding region 471, for example. The surface roughening may be provided by bead blasting the mold used to make the light guide 468 at the locations of the mold that form the light exit regions 105H. The light guide 468 may be made from a clear material, such as clear plastic. The plastic may be a polycarbonate resin thermoplastic, a polyacrylate, or other suitable clear plastic material, for example. The light guide 468 may include a center portion 474 that is adapted to fasten to the shield 458 such that the light sources 469 are properly aligned with the light receiving regions 470.

Figure 5D:
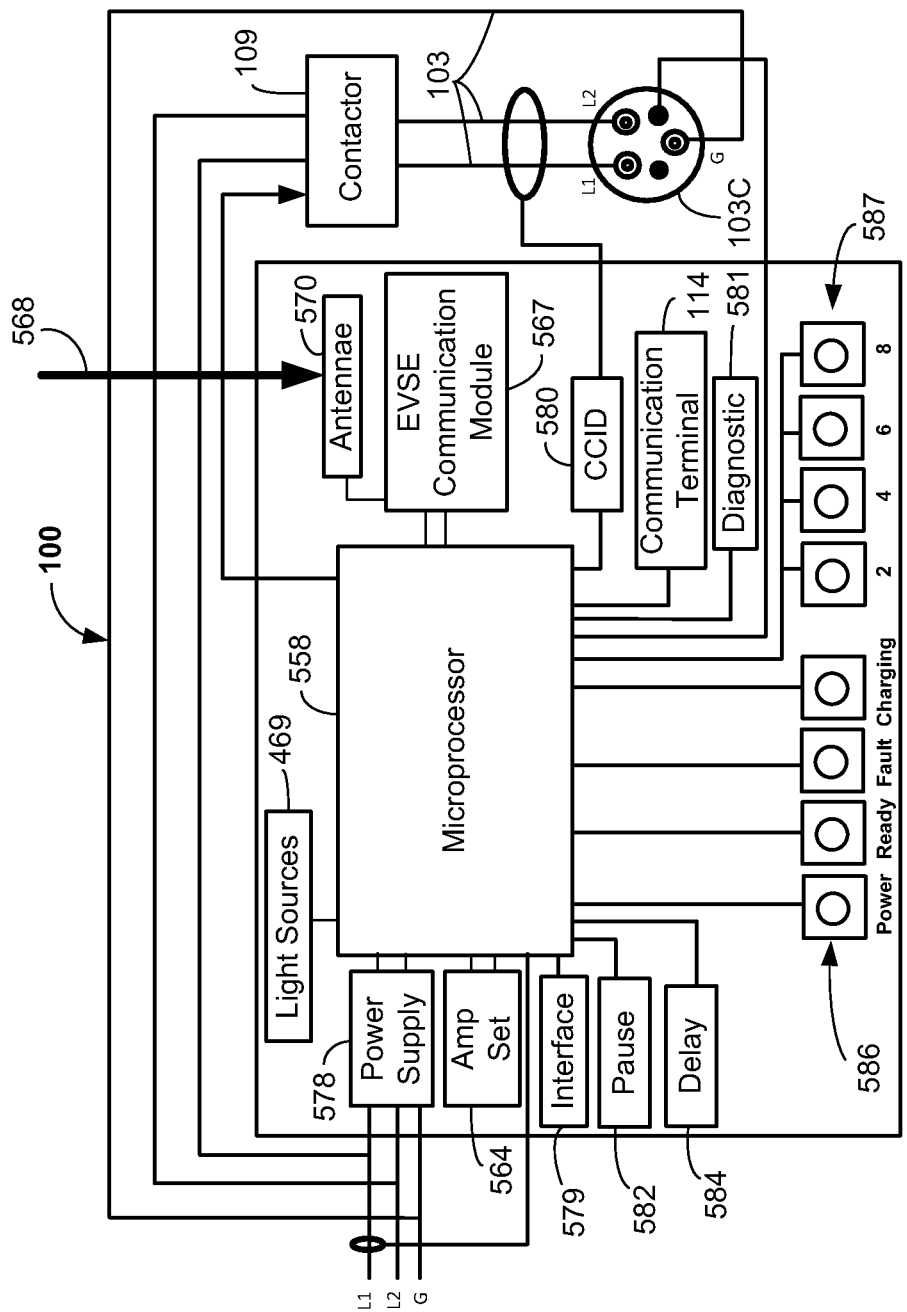
FIG. 5D is an electrical block diagram of an electric vehicle charging apparatus according to embodiments.

FIG. 5D illustrates a block diagram of an example embodiment of an electric vehicle charging apparatus 100. The electric vehicle charging apparatus 100 may include a maximum amperage set switch 564 that functions to limit the maximum amperage that the EV 504 can request from the electric vehicle charging apparatus 100. The amperage adjustment feature offers a mechanical means of limiting the current to the EV 504. This limit may be desirable either due to existing limitations of the electrical infrastructure of the residential electrical delivery system (e.g., load center), or a charging methodology that may "load shift" the energy demands of the electric vehicle charging apparatus 100 across a wider time of the day.

One embodiment of the maximum amperage set switch 564 is illustrated in FIGS. 4B-4D. In this embodiment, the printed circuit board 456 is located and secured in a pocket just below the surface of a shield 458. This printed circuit board 456 houses the microprocessor 558 (FIG. 5D) of the electric vehicle charging apparatus 100 and includes a maximum amperage set switch 564. In this embodiment, the maximum amperage set switch 564 may be a multi-position rotary switch. Optionally, the maximum amperage set switch 564 may be a dip switch or a series of 2 or 3 position switches. When the user rotates the switch, such as with a screwdriver (FIG. 4D), the maximum amperage set switch 564 signals an EVSE state machine located on the printed circuit board 456 to adjust a parameter of the charging. This data is then communicated to the EV 504 via industry standard protocol SAE J1772, for example, and the electronics inside the EV 504 limit the amperage delivered through the electric vehicle charging apparatus 100. The maximum charge amperage setting for the maximum amperage set switch may be between about 8 A and about 75 A, or even between about 8 A and about 30 A in some embodiments. By using a design wherein the access is recessed behind a surface of the center section 473 so that it requires a small screwdriver, a probability that the switch 564 will be accidently adjusted is reduced. This switch 564 can also easily be covered by a small piece of plastic or epoxy to reduce the likelihood that it is adjusted in the field by unqualified end users. In some embodiments, a small knob (e.g., plastic knob) may be molded on the top of switch 564 to allow rotation by hand. In any event, adjustment may not take place in the depicted embodiment without removing the lid 105 to gain access.

Again referring to FIG. 5D, the contactor 109 is connected to charge cable 103, which terminates at the electrical connector 103C. The electrical connector 103C may be a SAE J1772 connector and is adapted to couple to a receiving connector on the EV 504 (FIGS. 5A-5C). Other suitable connector may be used. The electric vehicle charging apparatus 100 may further include a communication terminal 114, such as a serial port (e.g., a differential serial port RS485 for data communication), which may be provided in the first inner cavity 106, for example. Other types of communication terminal connections may be used. Suitable power supply and conditioning 578 may be provided on the printed circuit board 456 or on the printed circuit board 453. In the depicted embodiment, a two board configuration is shown. However, it should be recognized that the various components may be combined on one board or separated into two or more boards. In the depicted embodiment, the printed circuit board 456 may be a low voltage board, carrying less than 24 V, for example. A user interface 579, such as one or more push buttons may be adapted to allow a user to input into the electric vehicle charging apparatus 100. A Charging Circuit Interrupting Device (CCID) 580 may be provided to monitor the differential current among the current carrying conductors and indicate the presence of a ground-fault to the microprocessor 558 as needed to provide personnel protection, such as per UL 2231, for example. A separate pause button 582 may be provided to start/stop the charging operation, as well as a delay input button 584 to enable input of delayed charging for an amount of delay time (e.g., 2, 4, 6 or 8 hours). Other visual indicators 586 may be provided that may be adapted to indicate whether the electric vehicle charging apparatus 100 is powered, ready, in a fault condition, or is charging. Visual indicators 587 may indicate the delay time. Visual indicators 586, 587 may be provided on the control panel 105C (see FIG. 4I).

The configuration of the visual indicators 586, 587 and the various inputs to the electric vehicle charging apparatus 100 will now be described in detail with reference to FIGS. 4H and 4I. These visual indicators 586, 587 may be provided by a plurality of LEDs, for example. The visual indicators 586, 587 may be provided by forward-projecting colored light sources, for example. The light sources may be forward firing LEDs that may be mounted on the printed circuit board 456. The light sources may project light forward through a plurality of channeling elements 488, 489 formed in the shield 458, and through the lid 105 so that status information can be displayed on the control panel 105C on a surface of the lid 105. Accordingly, the status may be displayed on the front lid 105 such that it may be readily viewable by the user. Various lights may be lit based upon the detected status.

Figure 4H:
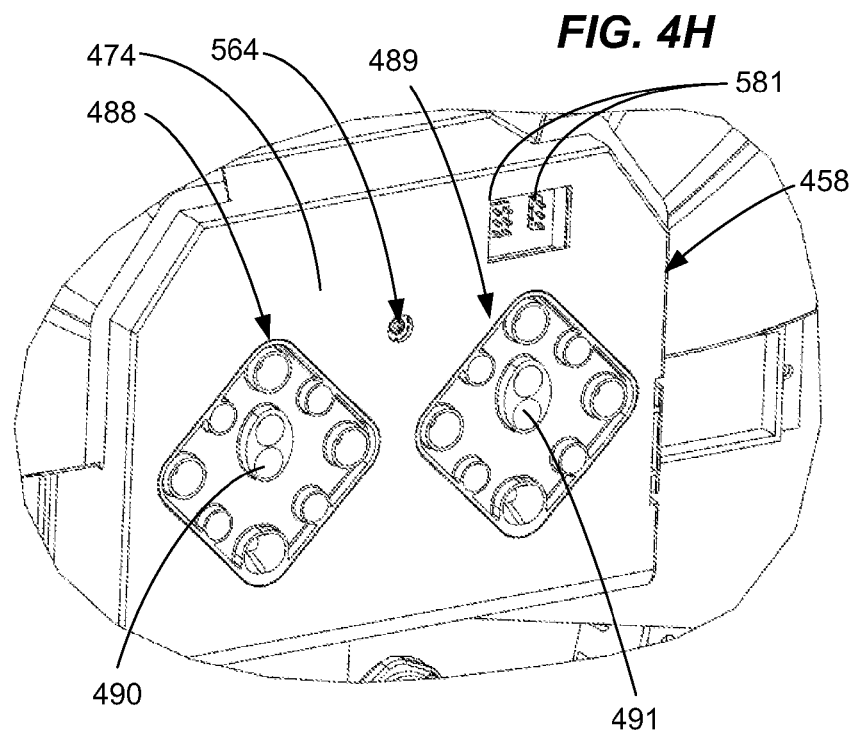
FIG. 4H illustrates an isometric front view of a plurality of light channels of the shield according to embodiments.
Figure 4I:
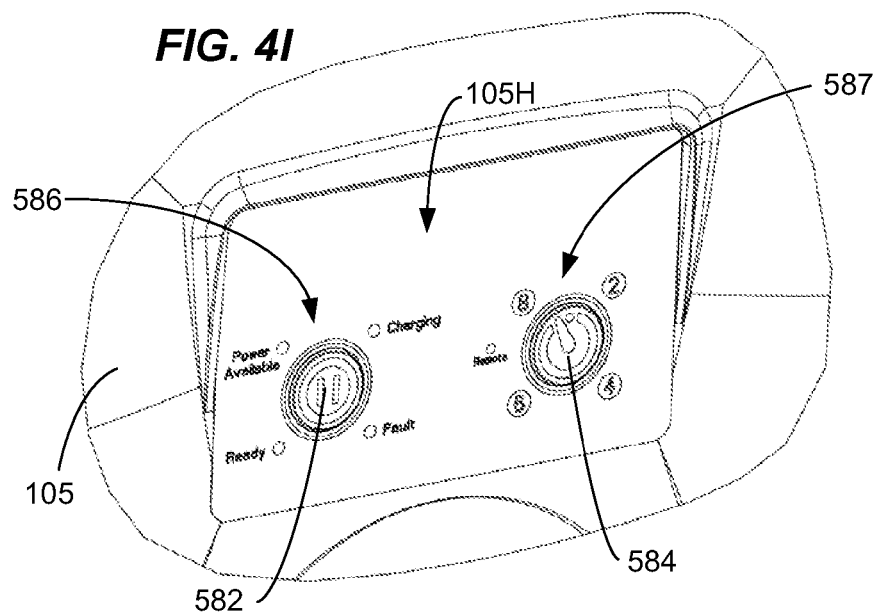
FIG. 4I illustrates an isometric front view of a control panel on the lid of the electric vehicle charging apparatus according to embodiments.

In FIG. 4H, the shield 458 may include a first plurality of channeling elements 488 that may indicate a status of the electric vehicle charging apparatus 100. Displayed status may include power available (e.g., orange), charging (e.g., green), ready (e.g., green), or fault (e.g., red), or pause (e.g., blue). Similarly, the second plurality of channeling elements 489 may indicate a delay of the electric vehicle charging apparatus 100, such as 2, 4, 6, or 8 hours, or the like. Nine channels are shown in FIG. 1H for each of the groups of channeling elements 488, 489. Some or all of the channels may be used. At a location relative to the shield 458, such as at a center of one or both of the plurality of channeling elements 488, 489, one or more switches 490, 491, such as a domed micro-switch may be provided. The switches 490, 491 may be mounted on the printed circuit board 456, for example. The switches 490, 491 may be operable by buttons 582, 584 mounted to the lid 105.

Figure 4J:
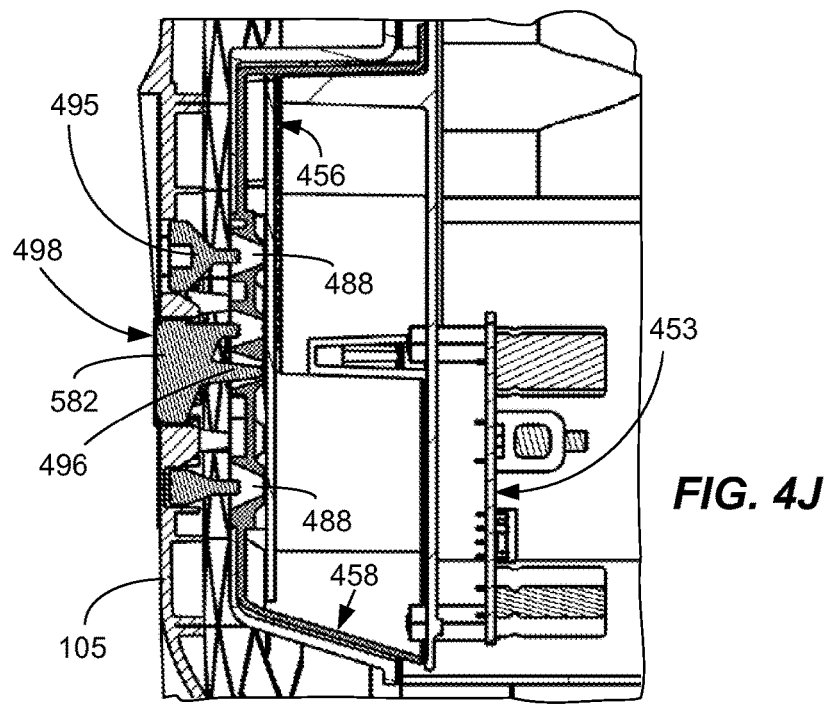
FIG. 4J illustrates a partial cross sectional side view of a control panel on the lid interfacing with a printed circuit board located behind the shield of the electric vehicle charging apparatus according to embodiments.

As shown in FIG. 4J, as the button 582 is depressed, a post 496 coupled to the button 582 may make contact with the switch 490. This toggles the switch 490 (FIG. 4G). For example, as shown in FIG. 4I, pressing the pause button 582 may pause the charging by the electric vehicle charging apparatus 100. A light may be projected to indicate the pause status next to the word "pause" on a thin film adhered to the cover and in contact with the front of the button 582. As depicted, four other lights may be projected through various ones of the plurality of channeling elements 488, depending upon the status (ready, power available, charge, or fault). Other numbers of lights and statuses may be displayed. Similarly, depressing button 584 may likewise toggle the switch 491 (FIG. 4G) and may be used to set the delay. Depending on the condition of the switch 491, one of the lights corresponding to one of the plurality of channeling elements 489 will be it. Thus, the delay time may be indicated on the lid 105 next to the indicia (e.g., 2, 4, 6, 8, or the like).

Figure 4K:
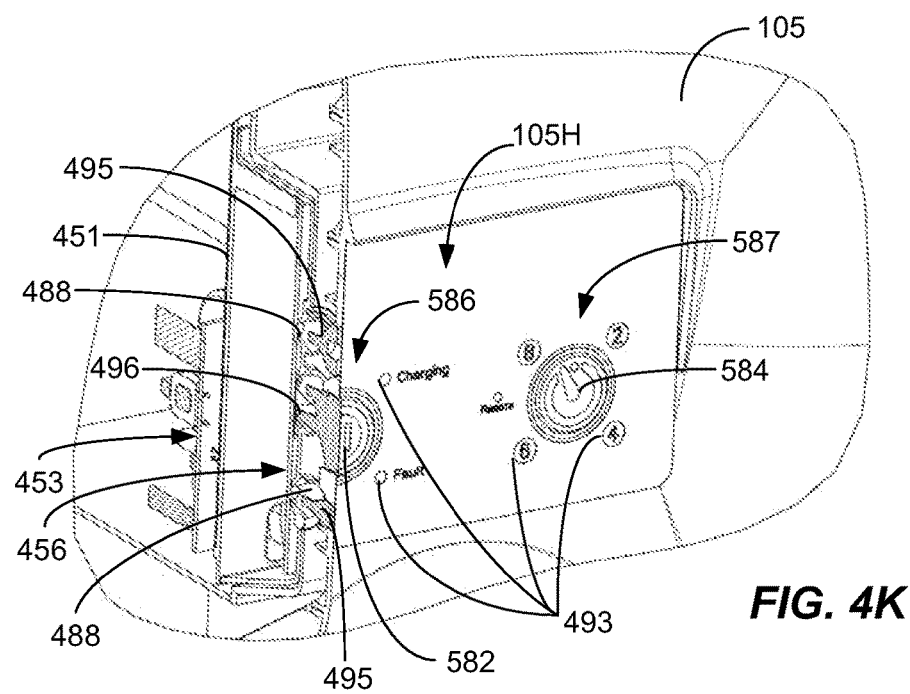
FIG. 4K illustrates a partial cross sectional isometric view of the control panel on the lid interfacing with a printed circuit board according to embodiments.
Figure 4L:
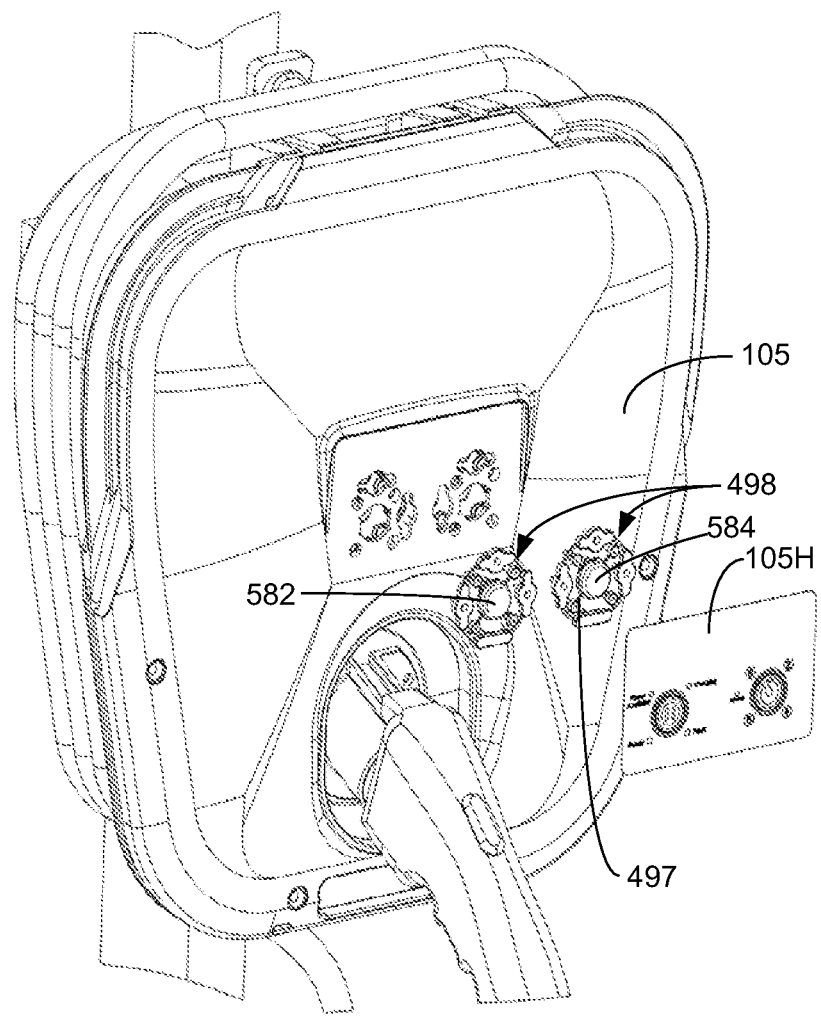
FIG. 4L illustrates an exploded isometric view of control panel components according to embodiments.

As shown in FIGS. 4J-4L, toggling of the pausing operation and the delay operation may take place through the lid 105. Likewise, status indications may be displayed on the lid 105. This is accomplished while still allowing the lid 105 to be removed or hinged such that it may rotate out of the way. Contact with the switches 490, 491 on the printed circuit board 456 is provided by posts 496 flexibly mounted to the lid 105 and coupled to the buttons 582, 584. The posts 496 may be part of a button and indicator assembly 498 wherein the buttons 582, 584 are flexibly mounted to the lid 105 by small beams 497 (FIG. 4L). Other flexible means for supporting the buttons 582, 584 may be used. Light passing through the light channels 488, 489 is received in the guiding elements 495 of the button and indicator assembly 498 and is displayed on the control panel 105H at locations 493, which may be clear portions in the control panel 105H. The control panel may be a thin film adhered to the lid 105 and buttons 582, 584.

In some embodiments, the electric vehicle charging apparatus 100 may include a communication module 567 that is adapted to wirelessly communicate with other devices or systems. The EVSE communication module 567 may have an antenna 570 connected to the communication module 567 and adapted to send and receive wireless signals 568 according to a suitable protocol from a device or system. For example, the communication module 567 may be used to communicate with a smart grid node of a utility, a smart meter of a utility, a home computer network, an electrical load panel, an internet portal so as to link to a service provider, such as to perform diagnostics, software updates, or the like. Any suitable digital communication protocol may be used, such as Wi-Fi, Wi-MAX, Bluetooth, ZigBee, Dash 7, EnOcean, or the like.

Figure 6:
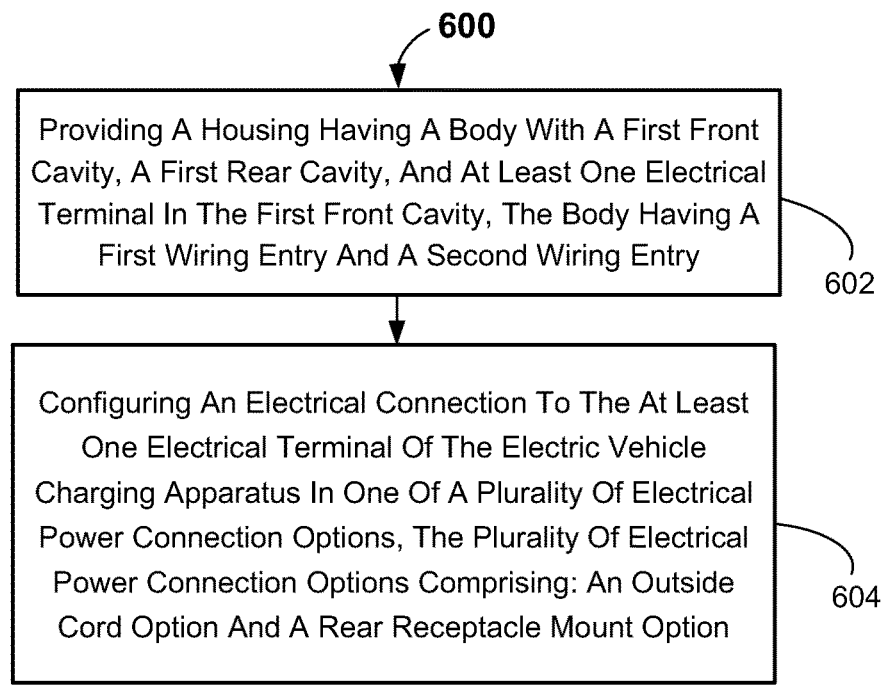
FIG. 6 is a flowchart of a method of configuring an electric vehicle charging apparatus according to embodiments.

A method of the invention will now be described with reference to FIG. 6. The method 600 of configuring an electric vehicle charging apparatus (e.g., electric vehicle charging apparatus 100) includes, in 602, providing a housing having a body (e.g., 104) with a first front cavity (e.g., 106), a first rear cavity (e.g., 120), and at least one electrical terminal (e.g., 107) in the first front cavity (e.g., 106), the body (e.g., 104) having a first wiring entry (e.g., 116) and a second wiring entry (e.g., 120), and, in 604, configuring an electrical connection to the at least one electrical terminal (e.g., 107) of the electric vehicle charging apparatus (e.g., 100) in one of a plurality of electrical power connection options, the plurality of electrical power connection options comprising: an outside cord option (FIG. 1C) wherein an outside cord (e.g., 128) and coupled outside electrical plug (e.g., 129) are adapted to electrically connect to an electrical receptacle (e.g., 508) located outside of a footprint of the body (e.g., 104), and the outside electrical cord (e.g., 128) is received through the first wiring entry (e.g., 116), and a rear receptacle mount option (FIG. 1F) wherein a rear cord (e.g., 132) and coupled rear electrical plug (e.g., 133) are received in the first rear cavity (e.g., 120) and adapted to electrically connect to an electrical receptacle (e.g., 340) located inside of the footprint of the body (e.g., 104) wherein the rear electrical cord (e.g., 132) is received through the second wiring entry (e.g., 130).

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular systems or methods disclosed, but, to the contrary, the intention is to cover all modifications, equivalents, and alternatives falling within the scope of the invention.

What is claimed is:

1. An electric vehicle charging apparatus, comprising:
a housing having a body with a first front cavity,
a second front cavity, and
a first rear cavity wherein the first front cavity and the second front cavity are separated from the first rear cavity by an intermediate wall, and at least one electrical terminal in the first front cavity,
the body having a first wiring entry through a peripheral wall of the body connecting directly into the first front cavity and a second wiring entry into the first front cavity from the first rear cavity,
the first wiring entry and the second wiring entry being configured to provide a plurality of electrical power connection options to provide power to the at least one electrical terminal located in the first front cavity, a divider wall separating the first front cavity from the second front cavity, and a lid coupled to the body, a first inner cover under the lid and covering the second front cavity but not the first front cavity,
wherein the lid covers the first inner cover and the first front cavity when closed and exposes the at least one electrical terminal when open, the second front cavity containing at least a contactor and a charging cable extending into the second front cavity, the first front cavity containing the at least one electrical terminal, the plurality of electrical power connection options comprising:
an outside cord option wherein an outside cord and coupled outside electrical plug are adapted to electrically connect to an electrical receptacle located outside of a footprint of the body, and the outside cord is received through the first wiring entry and connected to the at least one electrical terminal;
a rear receptacle mount option wherein a rear cord and coupled rear electrical plug are received in the first rear cavity and the adapted to electrically connect to an electrical receptacle located inside of the footprint of the body wherein the rear electrical cord is received through the second wiring entry but not through the first wiring entry and connected to the at least one electrical terminal.

2. The electric vehicle charging apparatus of claim 1, wherein the plurality of electrical power connection options further comprises:
an outside direct wire option wherein an outside electrical cable is adapted to electrically connect to a panel, and the electrical cable is received through the first wiring entry.

3. The electric vehicle charging apparatus of claim 1, wherein the plurality of electrical power connection options further comprises:
a rear direct wire option wherein a rear electrical cable is adapted to electrically connect through a gang box, and the rear electrical cable is adapted to pass through the second wiring entry.

4. The electric vehicle charging apparatus of claim 1, comprising a second rear cavity receiving a first portion of a charging cable adapted to electrically connect to an electric vehicle and a second portion of the charging cable extending into a second front cavity.

5. The electric vehicle charging apparatus of claim 1, comprising a sealed removable plug interchangeable between the first wiring entry and the second wiring entry.

6. The electric vehicle charging apparatus of claim 1, comprising a second inner cover under the lid covering the first inner cover wherein the second inner cover comprises a transparent or translucent material.

7. The electric vehicle charging apparatus of claim 6, wherein the second inner cover comprises a light guide configured to receive and guide, internally within the light guide, light to light exit regions located on opposite sides of the housing.

8. The electric vehicle charging apparatus of claim 1, comprising a lid coupled to the body and a post on the lid adapted to mount a charging connector.

9. The electric vehicle charging apparatus of claim 1, comprising a lid coupled to the body, and a safety cover under the lid and mounted over the at least one electrical terminal in the first front cavity.

10. The electric vehicle charging apparatus of claim 1, comprising one or more low voltage electrical terminals or communication terminals located within the first front cavity configured to provide data communication with a home network cable, a utility service communication cable, or other data communication cable.

11. The electric vehicle charging apparatus of claim 1, comprising:
a shield;
a printed circuit board under the shield;
a maximum amperage set switch operable by a user through the shield with the first inner cover secured to the body the maximum amperage set switch operable to adjustably limit an amperage delivered to an electric vehicle.

12. The electric vehicle charging apparatus of claim 1, comprising a maximum amperage set switch accessible by removing a lid to set a maximum charge amperage of the electric vehicle charging apparatus, maximum amperage set switch operable to adjustably limit an amperage delivered to an electric vehicle to between about 8 A and 75 A.

13. An electric vehicle charging apparatus installation, comprising:
a housing of an electric vehicle charging apparatus having a lower housing mounting feature and an upper housing mounting feature; and
a mounting bracket having a location feature comprising a cutout portion adapted to locate relative to an electrical receptacle by registering on a side of a cover or gang box, the mounting bracket having one or more installation features adapted to install the mounting bracket to a structure adjacent to the electrical receptacle, a lower bracket mounting feature adapted to receive the lower housing mounting feature, and an upper bracket mounting feature adapted to receive the upper housing mounting feature wherein one or both of the lower housing mounting feature and the upper housing mounting feature include first apertures, and one or both of the lower bracket mounting feature and the upper bracket mounting feature include second apertures, and the first and second apertures are aligned as installed.

14. An electric vehicle charging apparatus, comprising:
a housing having a body, a lid coupled to the body, and a first inner cover coupled to the body under the lid, the first inner cover and body forming a front cavity containing a contactor;
a maximum amperage set switch accessible under the lid and through the first inner cover and operable to adjust a maximum charge amperage for the electric vehicle charging apparatus, wherein the maximum amperage set switch is operable to manually adjust an amperage setting delivered to an electric vehicle to between about 8 A and 75 A with the first inner cover installed; and
a lower housing mounting feature and an upper housing mounting feature on the body, a mounting bracket coupled to the body, the mounting bracket having a location feature comprising a cutout portion adapted to locate on an electrical receptacle by registering on a side of a cover or gang box, the mounting bracket having one or more installation features adapted to install the mounting bracket to a structure adjacent to the electrical receptacle, a lower bracket mounting feature adapted to receive the lower housing mounting feature, and an upper bracket mounting feature adapted to receive the upper housing mounting feature.

15. The electric vehicle charging apparatus of claim 14, wherein the lid seals to the housing.

16. The electric vehicle charging apparatus of claim 14, wherein the maximum charge amperage setting for the maximum amperage set switch is between about 8 A and about 75 A and the maximum amperage set switch is mounted to a printed circuit board received in a pocket of a shield received proximate the first inner cover.

17. The electric vehicle charging apparatus of claim 14, comprising a first front cavity in the body, at least one electrical terminal in the first front cavity, and a safety cover mounted over the at least one electrical terminal underneath the lid.

18. The electric vehicle charging apparatus of claim 14, comprising one or more low voltage electrical terminals or communication terminals located within the first front cavity configured to provide data communication with a home network cable, a utility service communication cable, or other data communication cable.

19. An electric vehicle charging apparatus, comprising:
a housing having a body with a first front cavity, a second front cavity, a dividing wall separating the first front cavity from the second front cavity, the second front cavity containing at least a contactor and a charging cable extending into the second front cavity, a first inner cover covering the second front cavity, a first rear cavity on a rear of the body, a first wire entry into the first front cavity from a location outside the body, and a second wire entry located between the first front cavity and the first rear cavity;
at least one electrical terminal mounted in the first front cavity;
a lid coupled to the housing;
a first inner cover under the lid and covering the second front cavity but not the first front cavity, wherein the lid covers the first inner cover and the first front cavity when closed and exposes the least one electrical terminal when open;
a safety cover mounted over the at least one electrical terminal;
one or more low voltage electrical terminals or communication terminals located within the first front cavity configured to provide data communication with a home network cable, a utility service communication cable, or other data communication cable; and
one of a plurality of electrical power connection options configured to provide electrical power to the at least one electrical terminal, the plurality of electrical power connection options being selectable to be configured between:
an outside electrical cord and coupled outside electrical plug adapted to electrically connect to an electrical receptacle located outside of a footprint of the body, wherein the outside electrical cord is received through the first wiring entry but not the second wiring entry; and
a rear cord and rear electrical plug received in the first rear cavity and adapted to electrically connect to an electrical receptacle located inside of the footprint of the body with a through connector installed in the second wiring entry.

20. A method of configuring an electric vehicle charging apparatus, comprising:
providing a housing having a body with a first front cavity and a second front cavity separated by a dividing wall, the second front cavity containing at least a contactor and a charging cable extending into the second front cavity, a first rear cavity, and at least one electrical terminal in the first front cavity, the body having a first wiring entry through a peripheral wall of the body connecting directly into the first front cavity and a second wiring entry into the first front cavity from the first rear cavity, a lid coupled to the body, a first inner cover under the lid and covering the second front cavity but not the first front cavity, wherein the lid covers the first inner cover and the first front cavity when closed and exposes the least one electrical terminal when open; and
configuring an electrical connection to the at least one electrical terminal of the electric vehicle charging apparatus to provide power in one of a plurality of electrical power connection options, the plurality of electrical power connection options being selectable to be configured between:
an outside cord option wherein an outside cord and coupled outside electrical plug are adapted to electrically connect to an electrical receptacle located outside of a footprint of the body, and the outside electrical cord is received through the first wiring entry; and
a rear receptacle mount option wherein a rear cord and coupled rear electrical plug are received in the first rear cavity and adapted to electrically connect to an electrical receptacle located inside of the footprint of the body wherein the rear electrical cord is received through the second wiring entry, but not through the first wiring entry; and providing a removable plug or grommet in the first wiring entry or the second wiring entry that is unused.

* * * * *